US008851607B2

(12) United States Patent
Hoshii

(10) Patent No.: US 8,851,607 B2
(45) Date of Patent: Oct. 7, 2014

(54) PRINTING APPARATUS AND PRINTING METHOD

(71) Applicant: Seiko Epson Corporation, Tokyo (JP)

(72) Inventor: Jun Hoshii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 76 days.

(21) Appl. No.: 13/653,703

(22) Filed: Oct. 17, 2012

(65) Prior Publication Data

US 2013/0100190 A1 Apr. 25, 2013

(30) Foreign Application Priority Data

Oct. 19, 2011 (JP) .................................. 2011-229944

(51) Int. Cl.
*B41J 29/38* (2006.01)
*B41J 2/21* (2006.01)
(52) U.S. Cl.
CPC ................ *B41J 29/38* (2013.01); *B41J 2/2121* (2013.01)
USPC .................................. 347/14; 347/15; 347/43
(58) Field of Classification Search
CPC combination set(s) only.
See application file for complete search history.

(56) References Cited

U.S. PATENT DOCUMENTS 7,258,412 B2 * 8/2007 Maru et al. ...................... 347/15
7,959,252 B2 * 6/2011 Endo ............................... 347/19

FOREIGN PATENT DOCUMENTS

JP 2005-271372 10/2005
JP 2008-302521 12/2008

* cited by examiner

*Primary Examiner* — Thinh Nguyen
(74) *Attorney, Agent, or Firm* — Workman Nydegger

(57) ABSTRACT

A printing apparatus includes (A) a head that discharges first ink and second ink having a color different from that of the first ink, (B) an optical sensor that includes a light source and a light receiving section, and (C) a controller. In the printing apparatus, when the controller corrects a discharge amount of the second ink, the controller causes the head to discharge the first ink to form a first pattern on a medium, causes the optical sensor to detect light reflected from the first pattern, causes the head to discharge the second ink to form a plurality of second patterns having different gradation values on the first pattern, and causes the optical sensor to detect light reflected from the second pattern.

8 Claims, 18 Drawing Sheets

FIG. 3
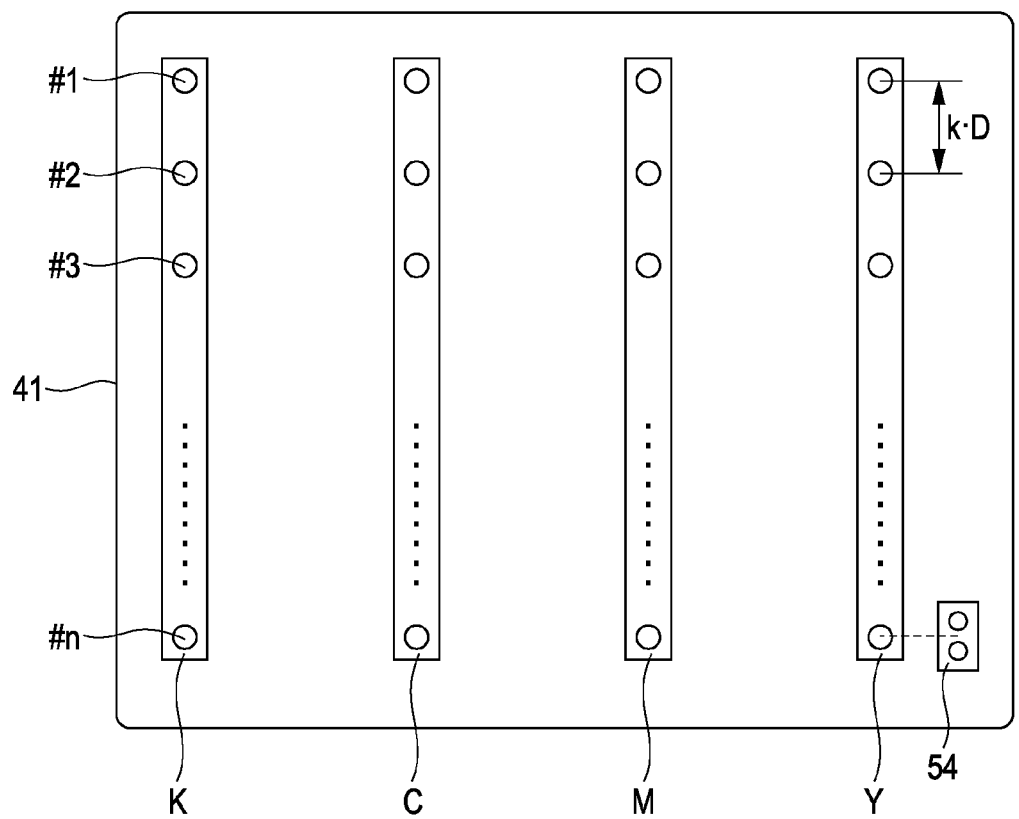
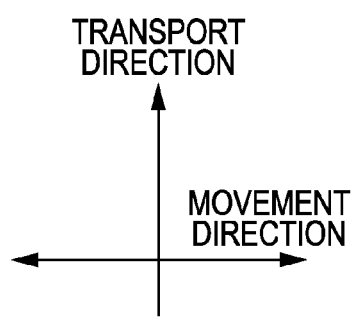

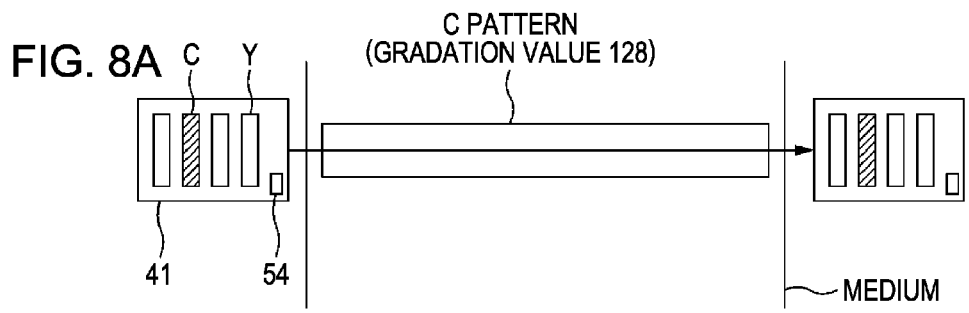
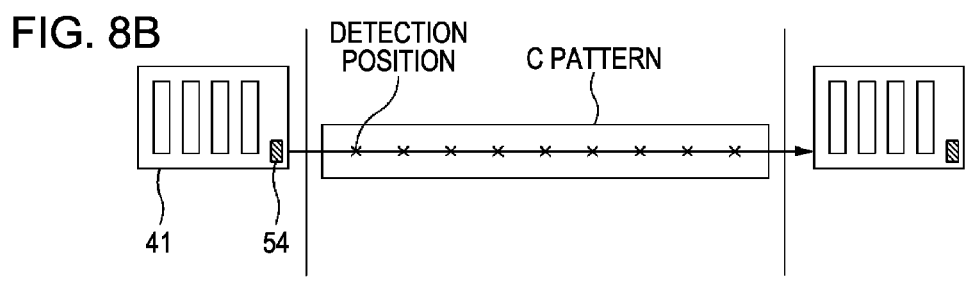
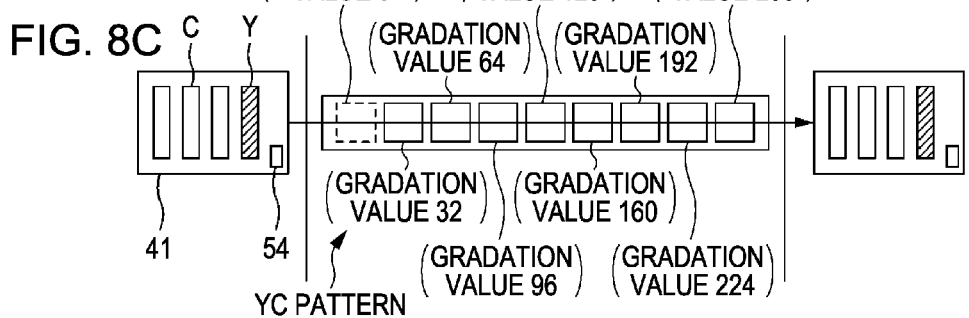
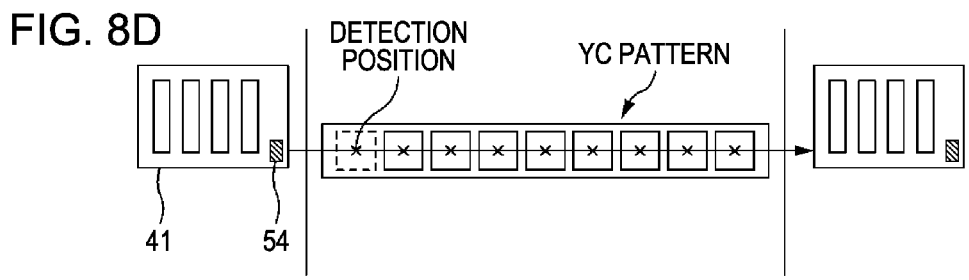

DETECTION AREA OF OPTICAL SENSOR

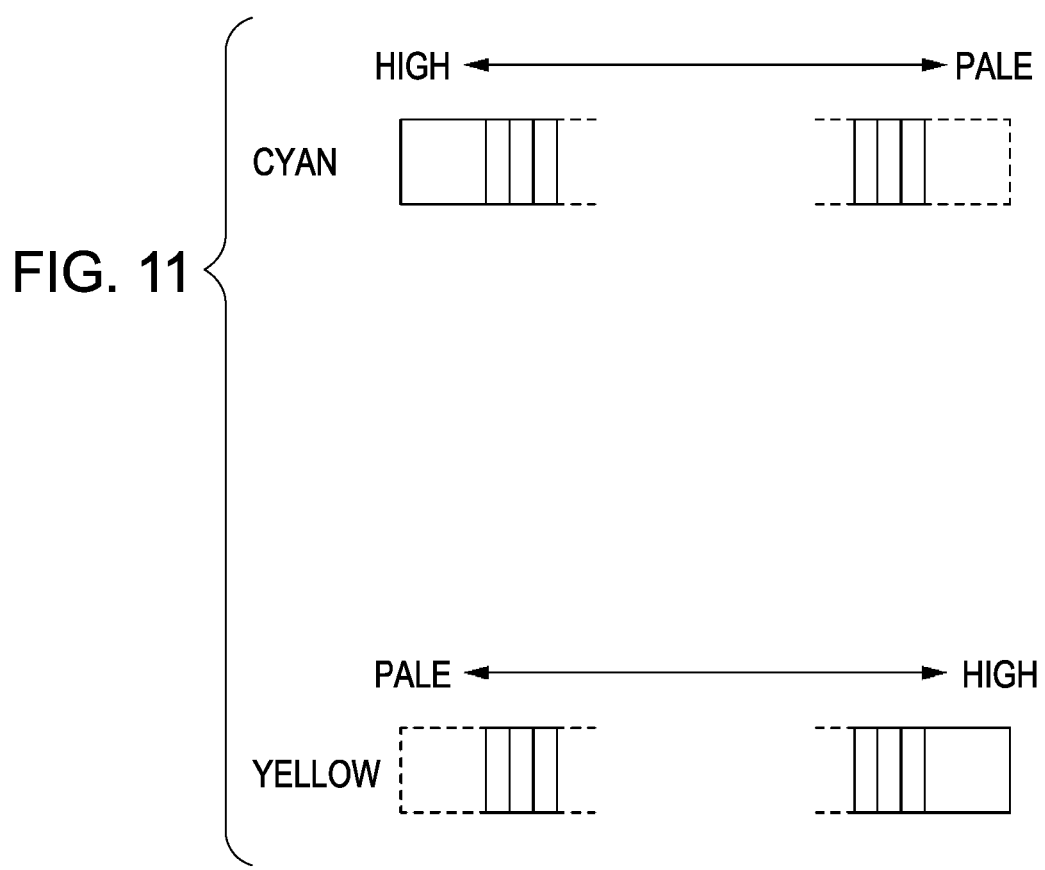

- SENSOR DETECTION RESULT OF Or PATTERN $\int R\_o(\lambda) \times g(\lambda) d\lambda$
- SENSOR DETECTION RESULT OF OrC PATTERN $\int R\_oc(\lambda) \times g(\lambda) d\lambda$

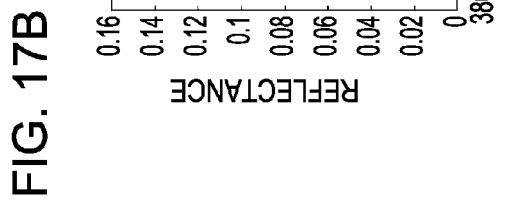
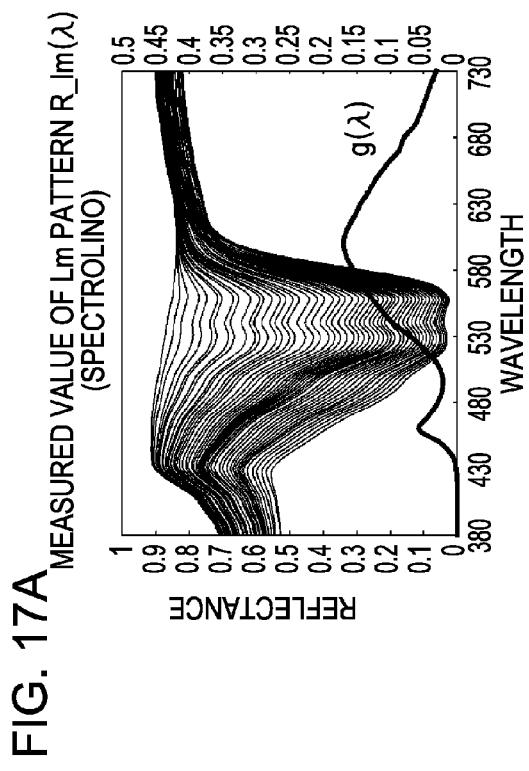
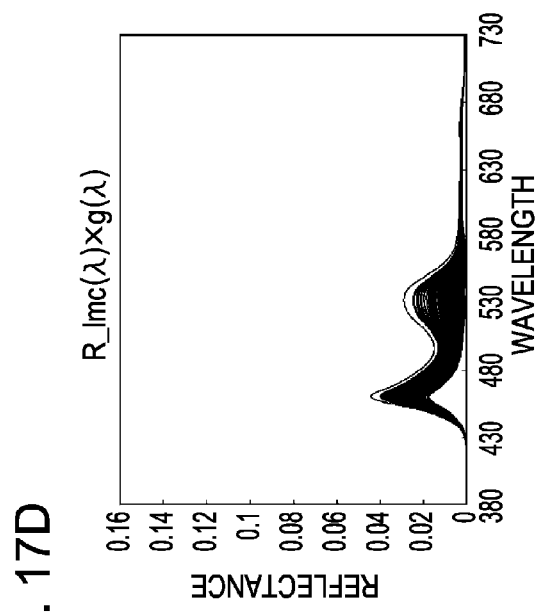
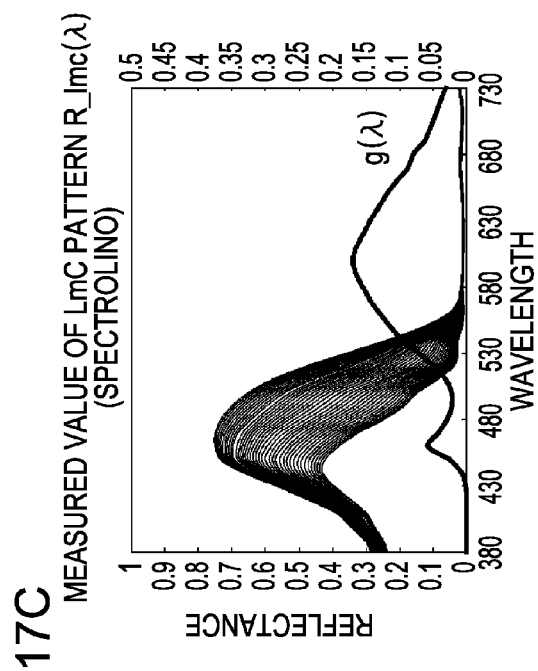

- SENSOR DETECTION RESULT OF Lm PATTERN ∫R_lm(λ)×g(λ)dλ
- SENSOR DETECTION RESULT OF LmC PATTERN ∫R_lmc(λ)×g(λ)dλ

PRINTING APPARATUS AND PRINTING METHOD

BACKGROUND

1. Technical Field

The present invention relates to a printing apparatus and a printing method.

2. Related Art

In the related art, in a printing apparatus that prints an image on a medium (paper, fabric, etc.), a test pattern is printed on the medium, and a correction process (calibration) is performed depending on the reading result of the test pattern (for example, see JP-A-2008-302521, and JP-A-2005-271372).

In JP-A-2008-302521, a large number of patches having different gradation values are printed on a test pattern, and a gradation value of an image to be printed is corrected depending on the read optical density of each of the patches (so-called color calibration is performed).

In JP-A-2005-271372, patches the optical densities of which vary depending on the relative position of a head are printed, and a position deviation amount is detected by detecting a patch having the highest optical density, so that print timing and print data are corrected depending on the deviation amount. In addition, in JP-A-2005-271372, a yellow patch is printed on a pale blue base because a optical density difference between yellow patches is not noticeable on a white sheet of paper.

It is only necessary that a patch having the highest optical density be detected because an object of JP-A-2005-271372 is to detect a position deviation amount. However, when the color calibration as discussed in JP-A-2008-302521 is performed, it is desirable that the optical density of each of the patches be detected with high accuracy.

Therefore, in a case in which a test pattern for color calibration is printed, when there is another color base under a patch having a color (for example, yellow) the optical density difference of which is hardly noticeable, a problem occurs in which the optical density detection accuracy of the color (for example, yellow) is reduced.

SUMMARY

An advantage of some aspects of the invention is that the detection accuracy of a pattern for color calibration is increased.

A printing apparatus according to an aspect of the invention includes (A) a head that discharges first ink and second ink having a color different from that of the first ink, (B) an optical sensor that includes a light source and a light receiving section, and (C) a controller. In the printing apparatus, when the controller corrects a discharge amount of the second ink, the controller causes the head to discharge the first ink to form a first pattern on a medium, causes the optical sensor to detect light reflected from the first pattern, causes the head to discharge the second ink to form a plurality of second patterns having different gradation values on the first pattern, and causes the optical sensor to detect light reflected from the second pattern.

The other features of the invention are described with reference to the specification and the accompanying drawings.

BRIEF DESCRIPTION OF THE DRAWINGS

FIG. 3 is a diagram illustrating the arrangement of nozzles in the lower surface of a head.

FIG. 8A is a diagram of an operation in the printing and detecting.

FIG. 8B is a diagram of an operation in the printing and detecting.

FIG. 8C is a diagram of an operation in the printing and detecting.

FIG. 8D is a diagram of an operation in the printing and detecting.

FIG. 11 is an illustrative diagram of a C pattern and a Y pattern that constitute a YC pattern.

FIG. 17A is a graph of the measurement result of spectral characteristics of an Lm pattern.

FIG. 17B is a graph obtained by multiplying spectral characteristics $R\_lm (\lambda)$ of the Lm pattern by the spectral characteristics $g (\lambda)$ of the optical sensor.

FIG. 17C is a graph of the measurement result of spectral characteristics of an LmC pattern.

FIG. 17D is a graph obtained by multiplying spectral characteristics R_lmc (λ) of the LmC pattern by the spectral characteristics g (λ) of the optical sensor.

DESCRIPTION OF EXEMPLARY EMBODIMENTS

Figure 1:
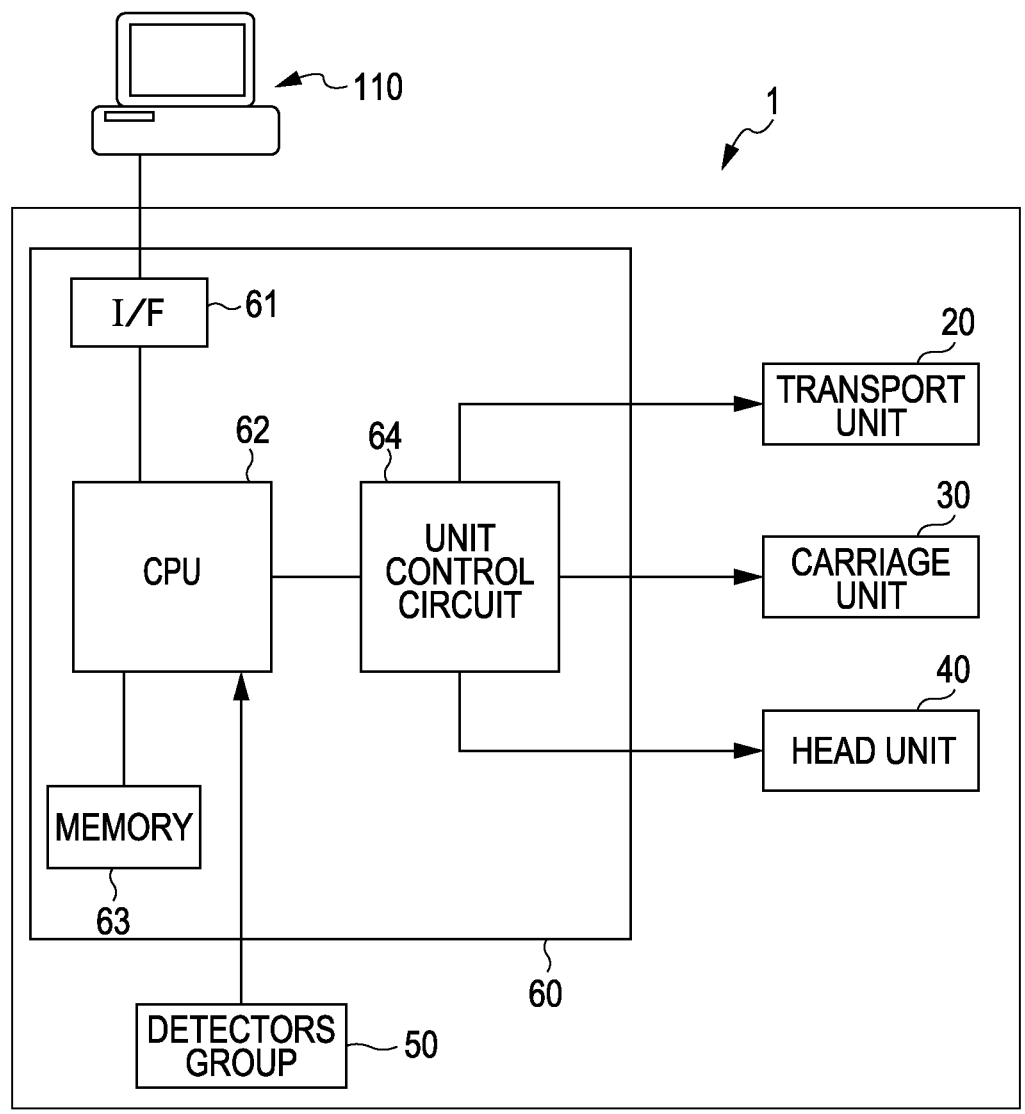
FIG. 1 is a block diagram of a general configuration of a printing apparatus.

At least the following matters are described with reference to the specification and the accompanying drawings.

A printing apparatus according to an aspect of the invention includes (A) a head that discharges first ink and second ink having a color different from that of the first ink, (B) an optical sensor that includes a light source and a light receiving section, and (C) a controller. In the printing apparatus, when the controller corrects a discharge amount of the second ink, the controller causes the head to discharge the first ink to form a first pattern on a medium, causes the optical sensor to detect light reflected from the first pattern, causes the head to discharge the second ink to form a plurality of second patterns having different gradation values on the first pattern, and causes the optical sensor to detect light reflected from the second pattern.

In such a printing apparatus, optical density detection accuracy of the second pattern is improved.

In an embodiment that is described later, cyan ink corresponds to the "first ink", and a cyan pattern (C pattern) corresponds to the "first pattern". In addition, yellow ink corresponds to the "second ink", and a yellow pattern (Y pattern) corresponds to the "second pattern". In addition, orange ink and light magenta ink may correspond to the "second ink". In addition, when the "correction of a discharge amount of the second ink" is performed, in a plurality of gradation values in the second ink, discharge amounts in the respective gradation values are different (before and after the correction). Therefore, the "correction of a discharge amount" is performed because the discharge amounts of ink are different before and after the correction in the result obtained by correcting the gradation values.

It is preferable that the output of the light source be adjusted depending on light reflected from the first pattern. Therefore, when the first pattern is formed under the second pattern, reduction in a light receiving amount of the optical sensor is suppressed, thereby increasing the output of the optical sensor.

It is preferable that the optical density of the first pattern under the second pattern having a first optical density be higher than the optical density of the first pattern under the second pattern having a second optical density that is higher than the first optical density. As a result, an ink amount per unit area can be reduced.

It is preferable that the head be allowed to discharge third ink having a color that is different from those of the first ink and the second ink, and after formation of the first pattern, it is preferable that the controller cause the head to discharge the third ink to form a third pattern on a medium before the controller causes the optical sensor to detect the light reflected from the first pattern. As a result, a formation time of the third pattern can be used for a drying period of the first pattern, thereby decreasing the processing time.

In the embodiment that is described later, magenta ink corresponds to the "third ink", and a magenta pattern (M pattern) corresponds to the "third pattern".

It is preferable that the head be allowed to discharge the third ink having a color that is different from those of the first ink and the second ink, and after formation of the second pattern on the first pattern, the controller cause the optical sensor to detect light reflected from the third pattern formed on the medium by the third ink before the controller causes the optical sensor to detect the light reflected from the second pattern. As a result, a detection time of the third pattern can be used for a drying period of the second pattern, thereby decreasing the processing time.

It is preferable that the controller change the optical density of the first pattern depending on the type of medium. As a result, patterns can be formed in accordance with an ink amount per unit area suitable for a medium.

It is preferable that the light source be a white light-emitting diode (LED) including a blue LED and a phosphor that shows a yellow fluorescence, and that the first ink be cyan, and the second ink be yellow. The printing apparatus is particularly effective under such conditions.

Described is a printing method according to another aspect of the invention, for correcting an amount of second ink to be discharged from a head that discharges first ink and the second ink having a color different from that of the first ink. The printing method includes: forming a first pattern on a medium, detecting light reflected from the first pattern using an optical sensor, discharging the second ink having a color different from that of the first ink, from the head and forming a plurality of second patterns having different gradation values on the first pattern, and detecting light reflected from the second pattern using the optical sensor.

In such a printing method, optical density detection accuracy of the second pattern is improved, and the correction of the gradation value (color calibration) can be performed with high accuracy.

Printing Apparatus

Figure 2A:
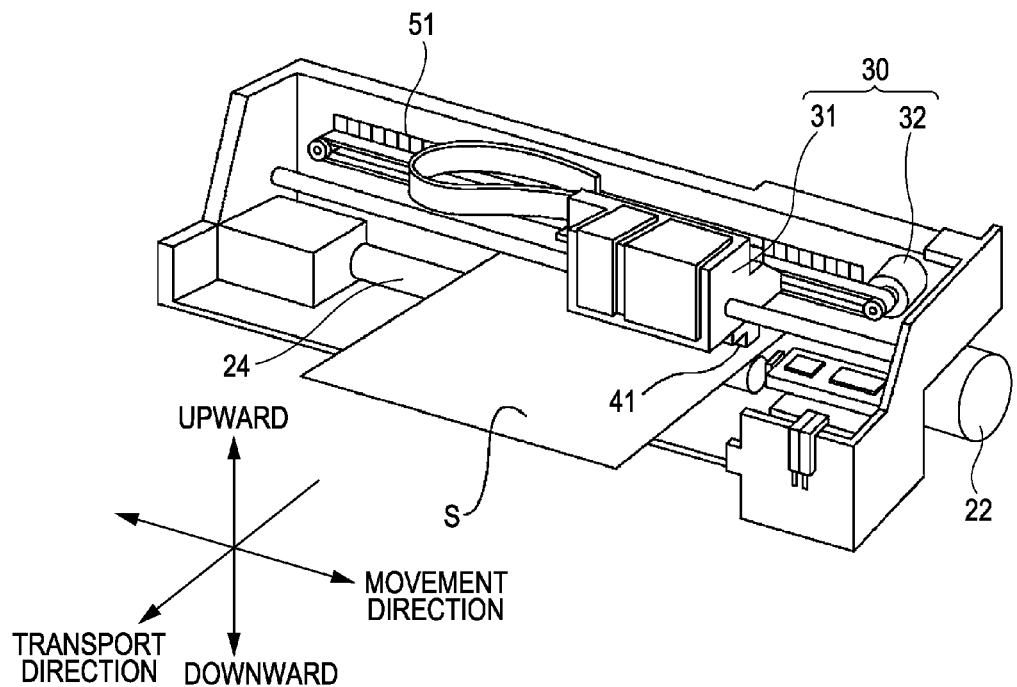
FIG. 2A is a schematic view of a general configuration of the printing apparatus.
Figure 2B:
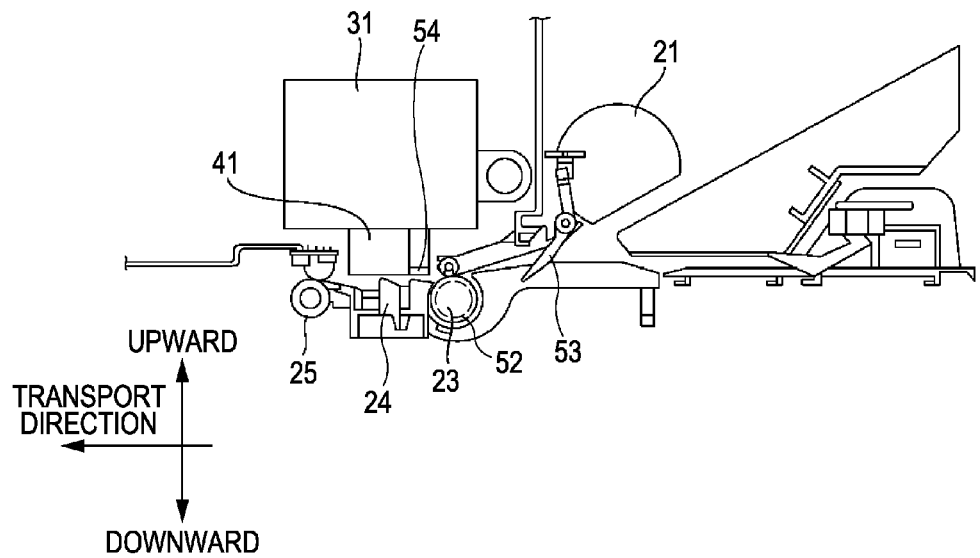
FIG. 2B is a cross-sectional view of the general configuration of the printing apparatus.

FIG. 1 is a block diagram of a general configuration of the printing apparatus 1. In addition, FIG. 2A is a schematic view of a general configuration of the printing apparatus 1. In addition, FIG. 2B is a cross-sectional view of the general configuration of the printing apparatus 1. A basic configuration of the printing apparatus 1 is described below.

The printing apparatus 1 includes a transport unit 20, a carriage unit 30, a head unit 40, a detector group 50, and a controller 60. The printing apparatus 1 that receives print data from a computer 110 that is an external device controls each of the units (the transport unit 20, the carriage unit 30, and the head unit 40) by the controller 60. The state of the printing apparatus 1 is monitored by the detector group 50, and the detector group 50 outputs the detection result to the controller 60.

The transport unit 20 transports a medium (for example, a paper sheet S, etc.) in a certain direction (hereinafter referred to as a transport direction). The transport unit 20 includes a paper feed roller 21, a transport motor 22 (also referred to as a PF motor), a transport roller 23, a platen 24, and a paper ejection roller 25. The paper feed roller 21 is a roller that feeds a paper sheet inserted into a paper insertion opening, to the inside of the printing apparatus 1. The transport roller 23 is a roller that transports the paper sheet S fed by the paper feed roller 21 to a printable area, and is driven by the transport motor 22. The platen 24 supports the paper sheet S that is being printed. The paper ejection roller 25 is a roller that discharges the paper sheet S to the outside of the printing apparatus 1 and is provided on the downstream side of the transport direction with respect to the printable area.

The carriage unit 30 performs movement (also referred to as "scanning") of the head in a certain direction (hereinafter referred to as a movement direction). The carriage unit 30 includes a carriage 31 and a carriage motor 32 (also referred to as a CR motor). The carriage 31 can reciprocate in the movement direction and is driven by the carriage motor 32. In addition, the carriage 31 removably holds an ink cartridge that stores ink.

The head unit 40 discharges ink onto the paper sheet. The head unit 40 includes a head 41 including a plurality of nozzles. When the carriage 31 moves in the movement direction, the head 41 also moves in the movement direction because the head 41 is provided in the carriage 31. In addition, when the head 41 intermittently discharges ink in the middle of movement in the movement direction, a dot line (raster line) along the movement direction is formed on the paper sheet.

The detector group 50 includes a linear encoder 51, a rotary encoder 52, a paper detection sensor 53, and the optical sensor 54. The linear encoder 51 detects the position of the carriage 31 in the movement direction. The rotary encoder 52 detects a rotation amount of the transport roller 23. The paper detection sensor 53 detects the position of the proximal end of the paper sheet that is being fed. The optical sensor 54 detects a pattern printed on the paper sheet by a light source and a light receiving sensor that are installed on the carriage 31.

The controller 60 is a control unit (control section) that controls the printing apparatus 1. The controller 60 includes an interface section 61, a central processing unit (CPU) 62, a memory 63, and a unit control circuit 64. The interface section 61 performs transmission and reception of data between the computer 110 that is an external device and the printing apparatus 1. The CPU 62 is an arithmetic processing device that controls the whole printing apparatus 1. The memory 63 is used to obtain an area such as an area to store a program and a work area for the CPU 28, and includes a storage element such as a random access memory (RAM) and an electrically erasable programmable read-only memory (EEPROM). The CPU 63 controls each of the units through the unit control circuit 64 in accordance with a program stored in the memory 63.

FIG. 3 is an illustrative diagram illustrating the arrangement of the nozzles on the lower surface of the head 41. A black ink nozzle group K, a cyan ink nozzle group C, a magenta ink nozzle group M, and a yellow ink nozzle group Y are formed on the lower surface of the head 41. Each of the nozzle groups includes a plurality of nozzles (here, 180 nozzles) that are discharge ports that discharge ink of a certain color.

The plurality of nozzles of each of the nozzle groups are aligned along the transport direction at regular intervals (nozzle pitch: k·D). Here, the "D" is a minimum dot pitch in the transport direction (that is, a distance between dots formed on the paper sheet S in maximum resolution). In addition, the "k" is an integer of 1 or more. For example, when the nozzle pitch is 180 dpi (1/180 inch) and the dot pitch in the transport direction is 720 dpi (1/720 inch), k is 4.

In the nozzles of each of the nozzle groups, a smaller number (#1 to #180) is given to a nozzle nearer the downstream side. That is, the nozzle #1 is placed nearer the downstream side in the transport direction than the nozzle #180.

The above-described optical sensor 54 is placed at a position that is substantially the same as the position of the nozzle #180 that is placed at the upper most position on the up stream side in the transport direction of the paper sheet.

Identification of the Optical Sensor

Figure 4:
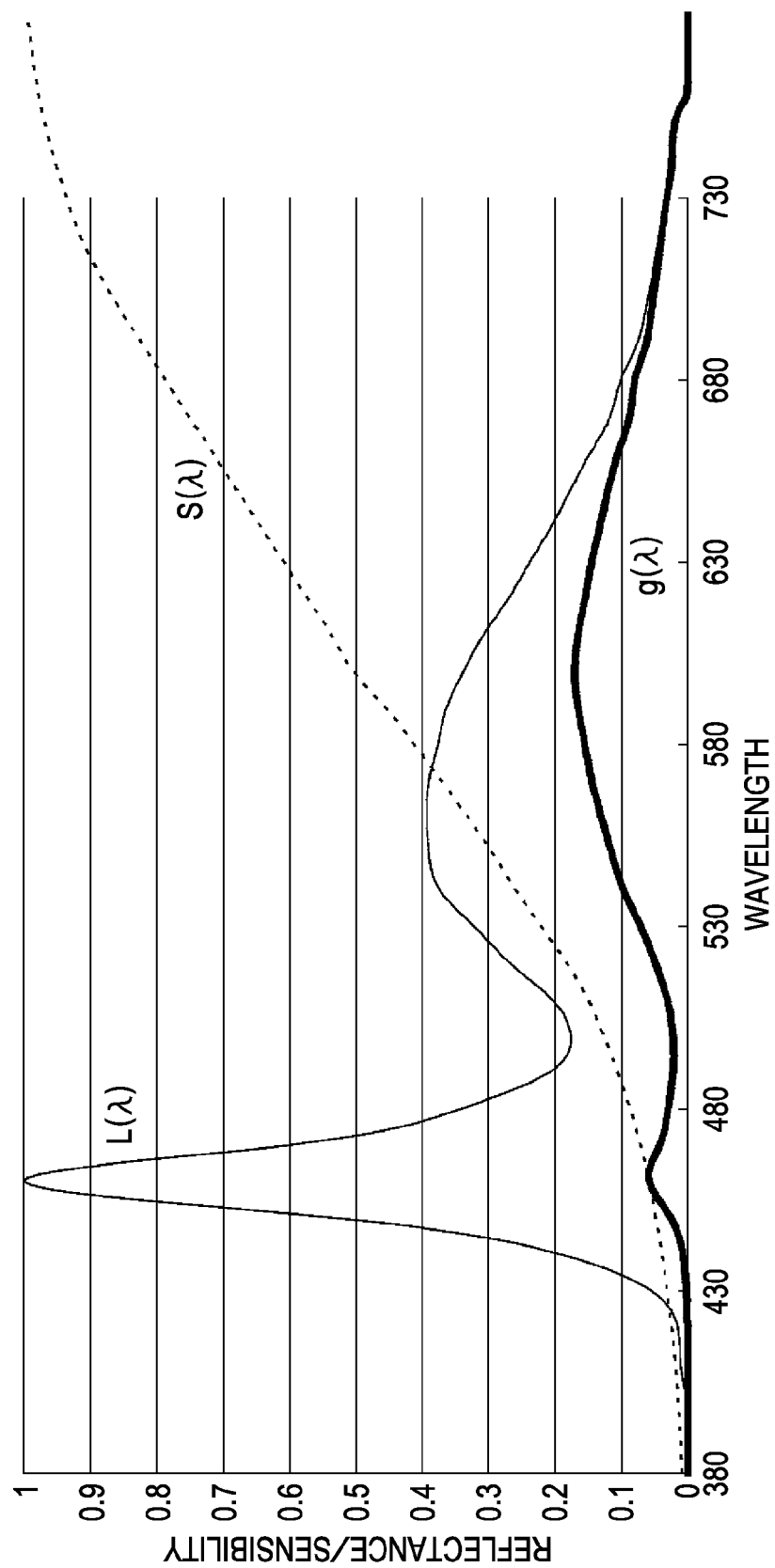
FIG. 4 is a graph of spectral characteristics of an optical sensor.

FIG. 4 is a graph of the spectral characteristics of the optical sensor 54.

The thin solid line in the graph is a curved line representing spectral characteristics L ($\lambda$) of the light source of the optical sensor 54. The light source of the optical sensor 54 is a so-called white LED (pseudo white LED) including a blue LED and a phosphor that show a yellow fluorescence. Therefore, in the case of L ($\lambda$), there is a sharp peak in a blue wavelength, and there is a gentle peak in the vicinity of the yellow wavelength. That is, the optical sensor 54 irradiates light of a component represented by the thin solid line in the graph.

The dotted line in the graph is a curved line representing spectral sensitivity characteristics S ($\lambda$) of the light receiving sensor of the optical sensor 54. Over a range of wavelengths of visible light, the light receiving sensor has characteristics in which the sensitivity of the light receiving sensor decreases with decreasing wavelength and the sensitivity of the light receiving sensor increases with increasing wavelength. Therefore, in the case of S ($\lambda$), the dotted line represents an ever-increasing trend.

The thick solid line in the graph is a curved line representing the spectral characteristics g ($\lambda$) of the optical sensor. The spectral characteristics g ($\lambda$) of the optical sensor are obtained by multiplying the spectral characteristics L ($\lambda$) of the light source by the spectral sensitivity characteristics S ($\lambda$) of the light receiving sensor. As illustrated in FIG. 4, in the spectral characteristics g ($\lambda$), there is a relatively small peak in the vicinity of a wavelength of 460 nm, and there is a relatively large peak in the vicinity of a wavelength of 600 nm.

Characteristics of a Y Pattern and Issues on the Measurement

Among the gradation values of 0 to 255, about 40 yellow patch patterns each having a gradation value difference of about 6 or 7 (hereinafter referred to as "Y pattern") are formed on a white medium, and the reflectance spectral characteristics of each of the patch patterns are measured.

In the following description, the "gradation value" indicates the gradation (optical density) of a color in data. On the other hand, in the following description, the "optical density" indicates the optical density of a color on a medium.

Figure 5B:
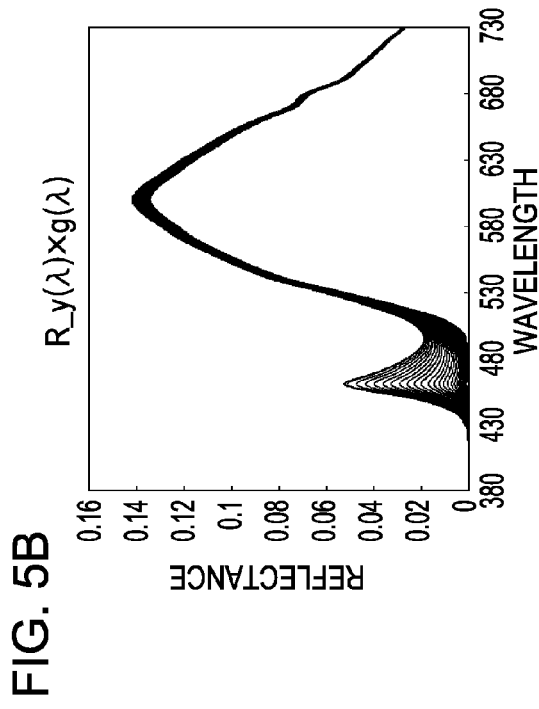
FIG. 5B is a graph obtained by multiplying spectral characteristics $R\_y (\lambda)$ of the Y pattern by spectral characteristics $g (\lambda)$ of the optical sensor.
Figure 5D:
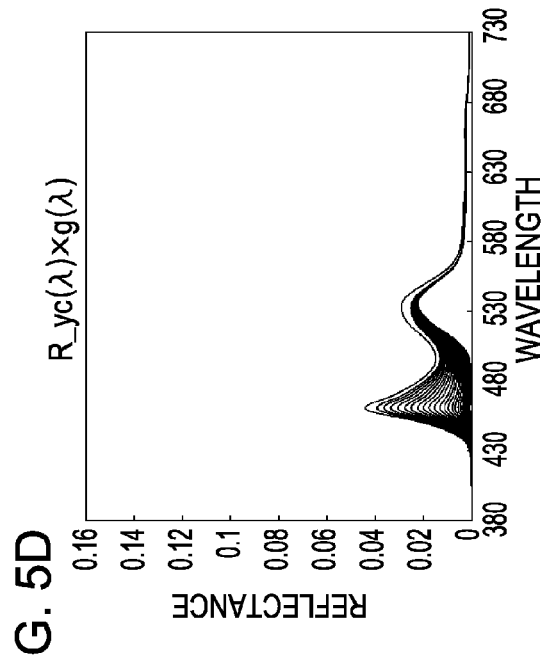
FIG. 5D is a graph obtained by multiplying spectral characteristics $R\_yc (\lambda)$ of the YC pattern by the spectral characteristics $g (\lambda)$ of the optical sensor.
Figure 5A:
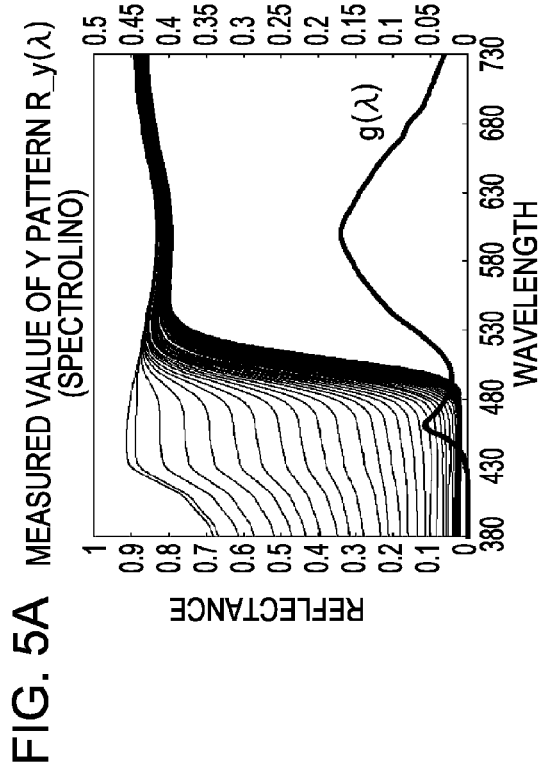
FIG. 5A is a graph of the measurement result of spectral characteristics of a Y pattern.

FIG. 5A is a graph of the measurement result of spectral characteristics of a Y pattern. In the following description, a curved line of the measurement result of spectral characteristics of a Y pattern of one gradation value may be referred to as R_y ($\lambda$).

In FIG. 5A, curved lines of the measurement results of Y patterns of the respective gradation values are drawn so as to overlap each other. As can be understood from FIG. 5A, for wavelengths of 500 nm or less, the reflectances of the Y patterns are different depending on gradation value. In addition, for wavelengths of 530 nm or more, the Y patterns have a high reflectance regardless of the gradation value.

In the graph of FIG. 5A, for reference, the spectral characteristics of the optical sensor (see the g ($\lambda$) of FIG. 4) are indicated by a thick line. A wavelength having a smaller peak in the g ($\lambda$) is in a band in which the reflectance of a Y pattern varies depending on gradation value, and a wavelength having a larger peak in the g ($\lambda$) is in a band in which the reflectance of a Y pattern becomes high regardless of the gradation value.

FIG. 5B is a graph obtained by multiplying spectral characteristics R_y ($\lambda$) of a Y pattern by the spectral characteristics g ($\lambda$) of the optical sensor. The spectral characteristics R_y ($\lambda$) of a Y pattern indicate a high reflectance for wavelengths of 530 nm or more regardless of the gradation value (see FIG. 5A), and there is a high peak in the vicinity of a wavelength of 600 nm in the spectral characteristics g (λ) of the optical sensor (see FIG. 4), so that there is a high peak in the vicinity of a wavelength of 600 nm in the graph of FIG. 5B for any gradation value of a Y pattern.

An output when the optical sensor detects a Y pattern having one gradation value corresponds to the integral value (=∫R_y (λ)×g (λ) dλ) in the graph of FIG. 5B. It can be understood from the graph that the output of the optical sensor is relatively difficult to change even when Y patterns having different gradation values are detected. Therefore, the dynamic range of the outputs of the optical sensor (ratio of maximum and minimum values of the outputs of the optical sensor) is small (that is, the optical density difference of the Y patterns is difficult to be detected) even when the optical sensor detects Y patterns having different gradation values.

Characteristics of a YC Pattern of the Embodiment

Next, among the gradation values of 0 to 255, about 40 Y patterns each having gradation value difference of about 6 or 7 are formed on a white medium after a cyan pattern having a uniform optical density is formed, and the reflectance spectral characteristics of each of the patch patterns are measured. In the following description, the yellow patch pattern formed on the cyan pattern may be referred to as a "YC pattern".

Figure 5C:
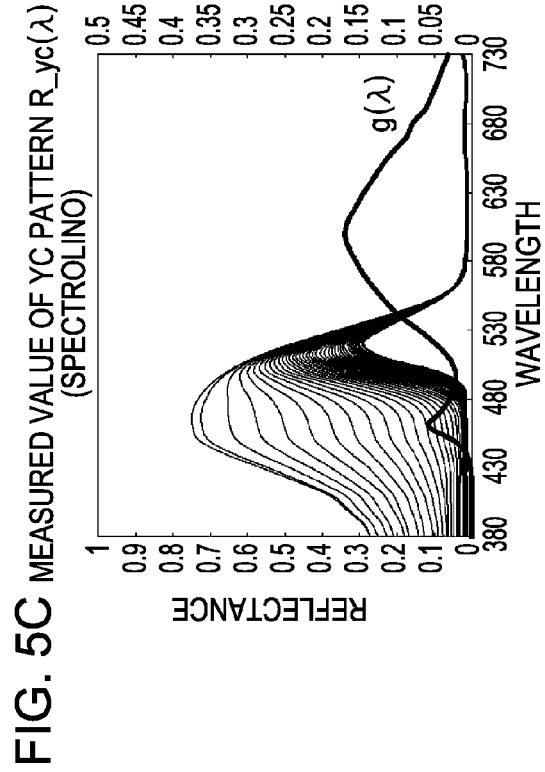
FIG. 5C is a graph of the measurement result of spectral characteristics of a C pattern.

FIG. 5C is a graph of the measurement result of spectral characteristics of a YC pattern. In the following description, a curved line of the measurement result of the spectral characteristics of a YC pattern of one gradation value may be referred to as R_yc (λ).

In FIG. 5C, curved lines of the measurement results of YC patterns of the respective gradation values are drawn so as to overlap each other. As can be understood from FIG. 5C, for wavelengths of 500 nm or less, the reflectances of the YC patterns are different depending on gradation value. In addition, for wavelengths of 530 nm or more, the YC patterns have a low reflectance regardless of the gradation value because the cyan pattern absorbs the yellow wavelength.

In the graph of FIG. 5C, for reference, the spectral characteristics of the optical sensor (see the g (λ) of FIG. 4) are indicated by a thick line. As illustrated in FIG. 5C, in a wavelength having a larger peak in the g (λ), the YC patterns have a high reflectance regardless of the gradation value (on the other hand, in FIG. 5A, in a wavelength having a larger peak in the g (λ), the reflectance of Y patterns is high).

FIG. 5D is a graph obtained by multiplying spectral characteristics R_yc (λ) of a YC pattern by the spectral characteristics g (λ) of the optical sensor. The spectral characteristics R_yc (λ) of a YC pattern indicate a low reflectance for wavelengths of 530 nm or more regardless of the gradation value (see FIG. 5C), so that, in the graph of FIG. 5D, the peak in the vicinity of a wavelength of 530 nm is low for any of the gradation values of YC patterns as compared with the peak at a wavelength of 600 nm in the graph of FIG. 5B.

An output (that corresponds to Praw (X) described later) when the optical sensor detects a YC pattern having one gradation value corresponds to the integral value (=∫R_yc (λ)×g (λ) dλ) in the graph of FIG. 5D. It can be understood from the graph that the output of the optical sensor is relatively easy to change when YC patterns having different gradation values are detected. Therefore, the dynamic range of the outputs of the optical sensor is large (that is, the optical density difference of the YC patterns is easy to detect) when the optical sensor detects YC patterns having different gradation values.

Figure 6A:
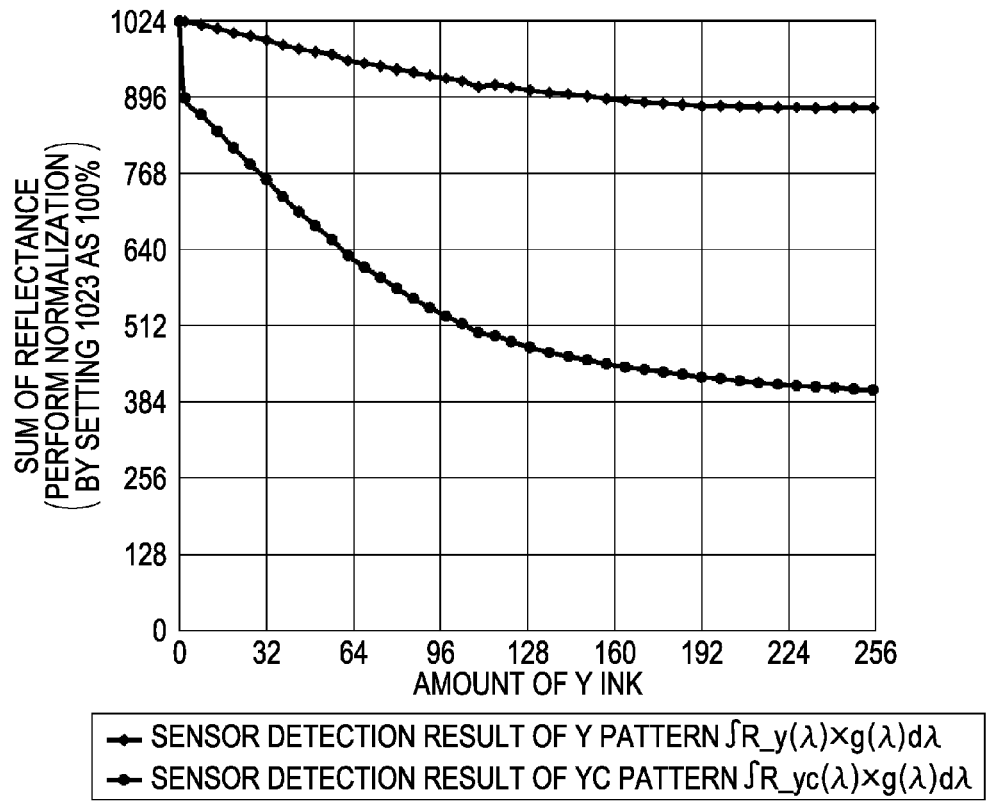
FIG. 6A is a graph of output change of the optical sensor for a yellow gradation value.

FIG. 6A is a graph of output change of the optical sensor for a yellow gradation value. The horizontal axis in FIG. 6A indicates a yellow ink amount (yellow gradation value). The vertical axis in FIG. 6A indicates the output of the optical sensor, and in the vertical axis, the maximum output value of the optical sensor is normalized so as to be "1024 (10 bit)". Squares in FIG. 6A indicate the case of a Y pattern, and circles indicate the case of a YC pattern.

As illustrated in FIG. 6A, the dynamic range in a YC pattern is large compared with the case of a Y pattern. That is, in the case where a Y pattern is measured, it is easy for the optical sensor to detect the optical density difference of the Y patterns when there is a C pattern under the Y patterns.

In the embodiment, when a Y pattern for color calibration is formed, a cyan pattern is formed under the Y pattern.

However, the optical density of a YC pattern may not be used for color calibration as the optical density of the yellow pattern as-is because the optical density of the YC pattern is affected by the optical density of the cyan pattern.

Therefore, in the embodiment, before a yellow pattern is formed on a cyan pattern, the cyan pattern is detected using the optical sensor. In addition, the optical density of the yellow pattern is calculated by normalizing an output value of the optical sensor when a YC pattern is detected using an output value of the optical sensor when the cyan pattern is detected. As a result, the actual optical density of the yellow pattern can be obtained with high accuracy without being affected by the optical density of the cyan pattern.

As can be understood by comparing the graphs of FIG. 5B and FIG. 5D, the output of the optical sensor when the YC pattern is detected is lower than the output of the optical sensor when the Y pattern is detected because the cyan pattern absorbs light to reduce the amount of light received by the optical sensor.

Therefore, in the embodiment, before a yellow pattern is formed on a cyan pattern, the cyan pattern is detected using the optical sensor, and an output (irradiation amount) of the light source of the optical sensor is increased so as not to become excessively bright. As a result, the reduction of the light receiving amount of the optical sensor due to absorption of light by the cyan pattern can be suppressed, and the output of the optical sensor when the YC pattern is detected is increased.

Figure 6B:
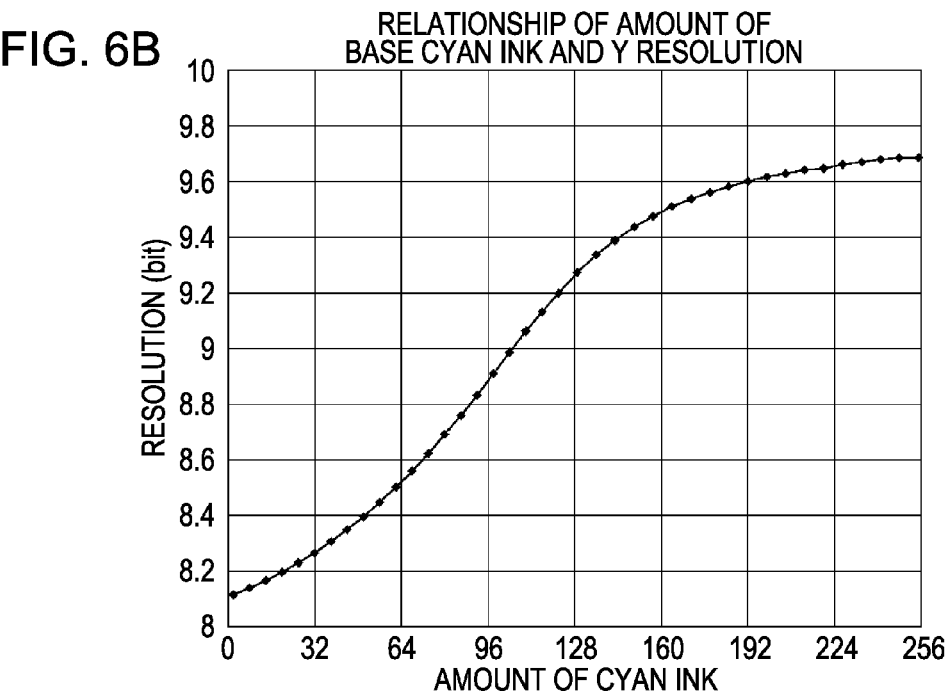
FIG. 6B is a graph illustrating change in the dynamic range of the optical sensor for different amounts of cyan ink.

FIG. 6B is a graph illustrating change in the dynamic range of the optical sensor for different amounts of cyan ink. The horizontal axis in FIG. 6B indicates the amount of cyan ink. The vertical axis in FIG. 6B indicates the difference between the maximum value and the minimum value of outputs of the optical sensor, using a bit. "8 bits" is obtained when the difference between the maximum value and the minimum value of the outputs of the optical sensor is "256", and "9 bits" is obtained when the difference is "512". The difference between the maximum value and the minimum value of the output values of the optical sensor increases as the value of the vertical axis increases, so that the measurement of a Y pattern is improved (the Y pattern can be detected with high accuracy).

As illustrated in FIG. 6B, the difference between the maximum value and the minimum value of output values of the optical sensor increases as the amount of cyan ink increases, so that the measurement of a Y pattern is improved. However, generally, the amount of ink that can be discharged per unit area of a medium is limited, so that when the amount of cyan ink is increased, the amount of yellow ink that can be discharged on the cyan ink is decreased. Therefore, in the embodiment, the amount of cyan ink is not set to a gradation value of 256 (100% optical density) but set to about a gradation value of 128 (50% optical density).

Ink amounts that can be discharged per unit area differ depending on the type of medium. Therefore, the controller may change the optical density of a cyan pattern formed under a yellow pattern by changing the setting of a cyan gradation value depending on the type of medium.

Color Calibration Using a YC Pattern

Figure 7:
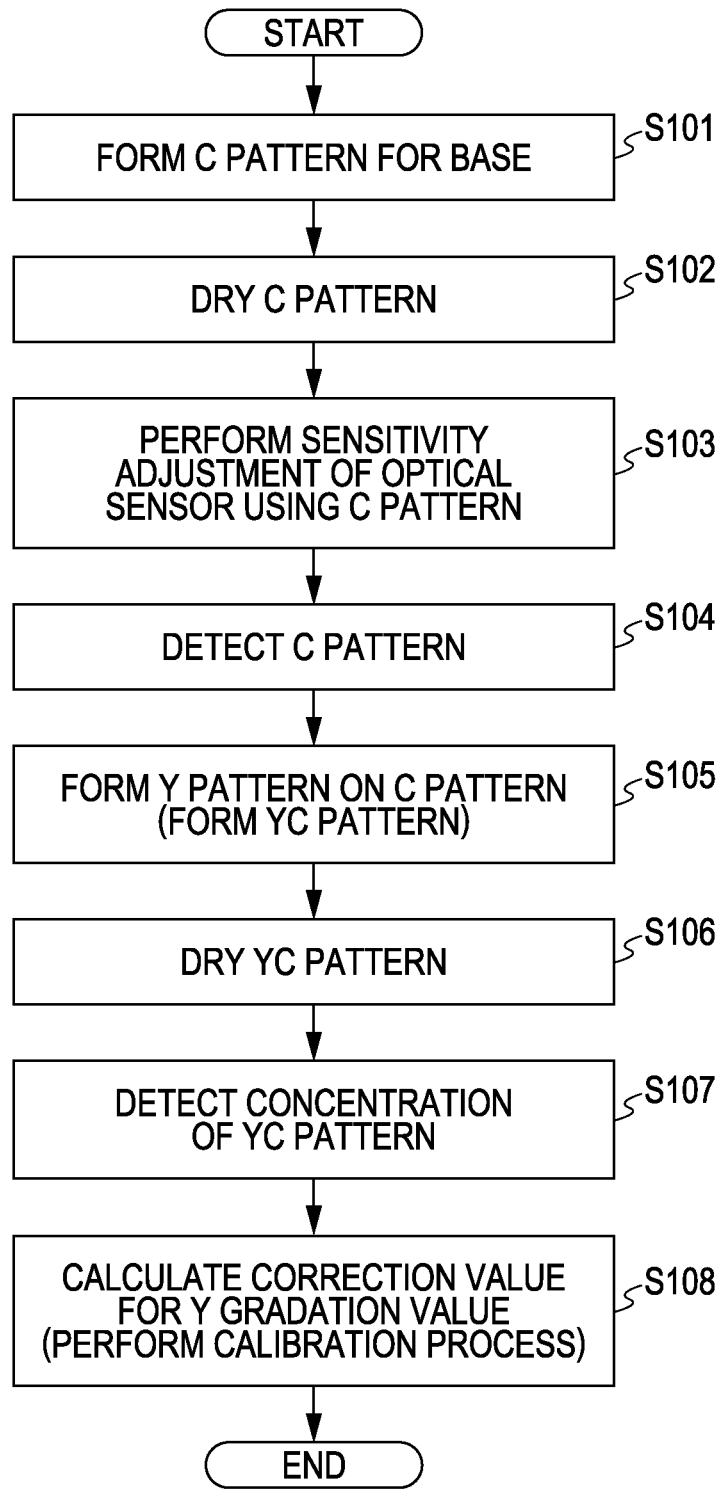
FIG. 7 is a flowchart of a color calibration method according to an embodiment.

FIG. 7 is a flowchart of the color calibration method according to the embodiment. FIGS. 8A to 8D are illustrative diagrams illustrating operations in the printing and detecting of a YC pattern.

First, the controller 60 causes the cyan ink nozzle group C of the head 41 to discharge cyan ink (that corresponds the first ink) to form a cyan pattern constituting a YC pattern (hereinafter, the cyan pattern may be referred to as a "C pattern") on a medium (S101 of FIG. 7, and FIG. 8A). Here, the C pattern has an oblong rectangular shape with a gradation value of 128 (50% optical density). However, the C pattern is not limited to the oblong rectangular shape, and the C pattern may be constituted by a plurality of (for example, nine) square-shaped patch patterns.

After that, the controller 60 waits until a specific time period elapses in order to dry the C pattern (S102 in FIG. 7) because the optical density of the C pattern varies as time passes and cannot be detected stably if the optical density of the C pattern is detected before the C pattern dries.

After that, the controller 60 performs sensitivity adjustment of the optical sensor 54 using the C pattern (S103 of FIG. 7). At this time, the controller 60 causes the optical sensor 54 once to detect the C pattern, and controls the output of the light source of the optical sensor 54 to be increased (adjusts the output of the light source to be increased) so as not to become excessively bright (so as not to become a maximum output due to reflected light from the C pattern).

After that, the controller 60 causes the optical sensor 54 to detect the optical density of the C pattern after the sensitivity adjustment (S104 of FIG. 7, and FIG. 8B). At this time, the controller 60 controls the optical density of the C pattern to be detected at a position at which a Y pattern that constitutes a YC pattern will be formed. As described later, the detection of the optical density of the C pattern is performed at nine locations because nine Y patterns are formed.

Alternatively, the detection of the optical density of the C pattern may be performed at one location. In addition, alternatively, the average optical density of the C pattern may be detected. However, as described in the embodiment, when the optical density of the C pattern is detected at each of the positions of the Y patterns, an actual yellow optical density can be calculated with high accuracy even when there is an uneven optical density between the C patterns (the optical densities of the C patterns are different depending on position).

After that, the controller 60 causes the yellow ink nozzle group C of the head 41 to discharge yellow ink (that corresponds to second ink) and controls the Y pattern to be formed on the C pattern to form the YC pattern (S105 of FIG. 7, and FIG. 8C). At this time, nine Y patterns having different gradation values among the gradation values of 0 to 255 are formed on the oblong rectangular C pattern having a uniform optical density.

After that, the controller 60 waits until a specific time period elapses in order to dry the YC pattern (S106 in FIG. 7) because the optical density of the YC pattern varies as time passes and cannot be detected stably if the optical density of the YC pattern is detected before the YC pattern dries.

After that, the controller 60 causes the optical sensor 54 to detect the optical density of the YC pattern on which the sensitivity adjustment has been performed in S103 (that is, the optical sensor 54 on which the sensitivity adjustment has been performed using the C pattern). When the Y pattern is formed on the C pattern, the output of the optical sensor 54 does not become excessively bright because a light receiving amount of the optical sensor 54 is reduced.

The detection result of a YC pattern having a yellow gradation value X is normalized as represented in the following formula.

$$P(X) = \{Praw(X) - Praw(255)\} / \{Praw\_c(X) - Praw(255)\}$$

The "Praw (X)" in the formula is an output value (raw data) of the optical sensor 54 when the YC pattern having the yellow gradation value X is detected.

The "Praw (255)" is an output value of the optical sensor when a YC pattern having a yellow gradation value of 255 (maximum optical density) is detected.

The "Praw_c (X)" is an output value of the optical sensor when a C pattern is detected at the position of the YC pattern having the yellow gradation value X in S104.

The "P (X)" is the normalized detection value.

Here, the normalization is performed so that a detection value of the pattern having the palest gradation value of 0 is "0" and a detection value of the pattern having the highest gradation value of 255 is "1". Therefore, the value of the "P (X)" ranges from "0" to "1". Alternatively, the normalization may be performed based on another formula. In addition, alternatively, the normalization may be performed with respect to a pattern having another gradation value.

In the embodiment, when the C pattern is formed under the Y pattern, the difference between "Praw (0)" approximately corresponding to the "Praw_c (X)" in the above-described formula and the "Praw (255)" increases (the difference between the maximum value and the minimum value of an output value of the optical sensor increases), so that the optical density difference between the YC patterns is easily detected. In addition, the output value Praw (X) detected in this way is normalized, so that the detection value "P (X)" after the normalization becomes a value that reflects the actual yellow optical density with high accuracy.

In addition, in the embodiment, the output value "Praw (X)" of the optical sensor when the YC pattern is detected is normalized based on the output value "Praw_c (X)" of the optical sensor when the C pattern is detected. As a result, the yellow optical density itself can be detected with high accuracy even when the C pattern is formed with a high optical density (or a pale optical density).

A case is considered in which the output value "Praw (X)" of the optical sensor when the YC pattern is detected is regarded as the optical density of the Y pattern as is (a case is considered in which the normalization is not performed based on the output value "Praw_c (X)" of the optical sensor when the C pattern is detected). In this case, when the C pattern is formed with a high optical density, the YC pattern is also formed with a high optical density. Therefore, it may be incorrectly detected that the optical density of the Y pattern is high even when the Y pattern is formed properly with the optical density corresponding to the gradation value.

Finally, the controller 60 obtains correction data for correcting each yellow gradation value based on the detection value "P (X)" obtained after the normalization, (S108).

Figure 9:
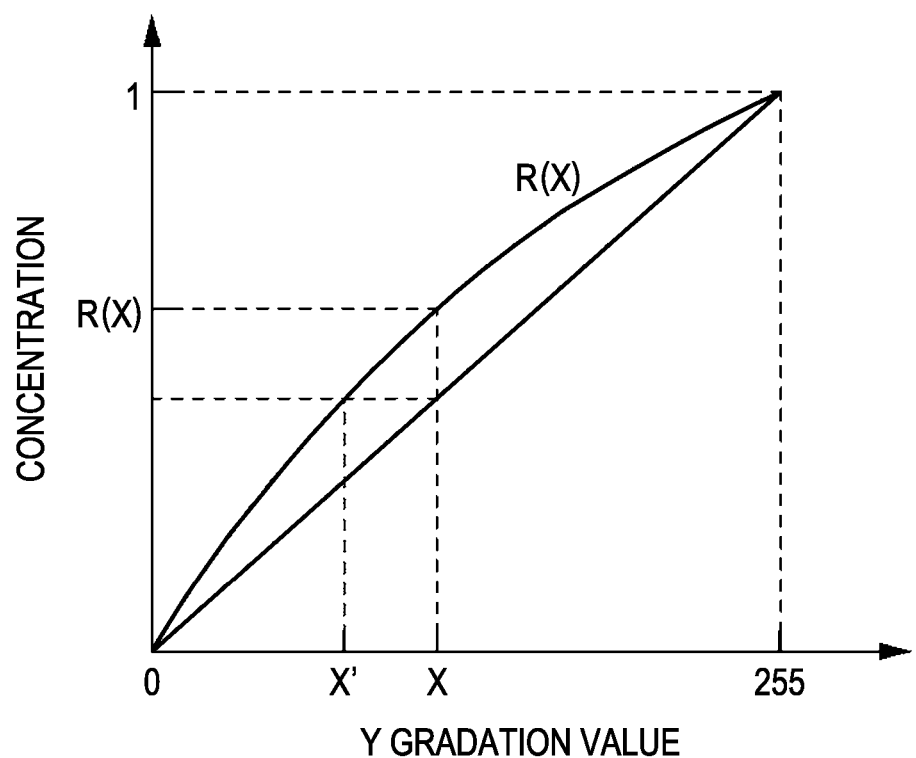
FIG. 9 is an illustrative diagram of the correction of a gradation value X.

FIG. 9 is an illustrative diagram of the correction of a gradation value X. The horizontal axis in FIG. 9 indicates a yellow gradation value in image data. The vertical axis in FIG. 9 indicates the optical density of the image printed on a medium. In the case illustrated in FIG. 9, when printing is performed based on the gradation value X without correcting the yellow gradation value, the printing is performed with a relatively high optical density. Therefore, the controller 60 corrects a gradation value from "X" to "X'" (as illustrated in FIG. 9), and performs printing based on the gradation value X' obtained after the correction. As a result, the print image is printed on the medium with the optical density corresponding to the gradation value X. The controller 60 performs the correction process (color calibration) similar to the case of the gradation value X, for the other gradation values.

Modification

YC Pattern (1)

Generally, a patch pattern for color calibration is desired to be formed larger than a detection area (detection spot) of the optical sensor 54 because the optical density of the patch pattern cannot be detected with high accuracy when the patch pattern is smaller than the detection area of the optical sensor 54. Therefore, in the above-described YC pattern, the approximately square-shaped Y pattern is formed on the oblong rectangular C pattern.

However, in such a pattern, the number of Y patterns that can be formed is limited, so that patch patterns of excessively many gradations cannot be formed. In addition, a large print area is desired when the patch patterns corresponding to all of the gradation values are formed, so that a consumption amount of a medium is increased.

However, when a YC pattern is formed as described below, the patch patterns corresponding to all of the gradation values of 0 to 255 can be formed in a narrow print area.

Figure 10A:
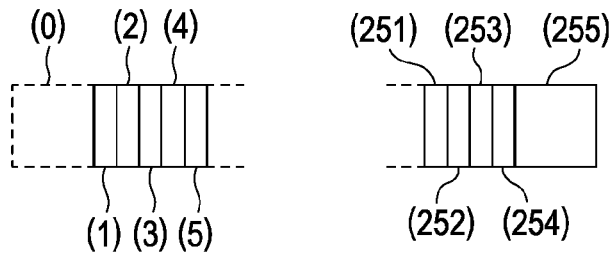
FIG. 10A is an illustrative diagram of a Y pattern formed on a C pattern.

FIG. 10A is an illustrative diagram of Y patterns formed on a C pattern. The numbers in parentheses in FIG. 10A indicate yellow gradation values.

The 256 patterns having the gradation values of 0 to 255 are formed in parallel in the movement direction so that the gradation value varies successively. Each of the two yellow patterns (patterns having gradation values of 0 and 255) located at the each of the ends has the width of the movement direction and the width of the transport direction any of which is larger than the diameter of the detection area (spot diameter) of the optical sensor 54.

However, each of a large number of yellow patterns (patterns having gradation values of 1 to 254 that are intermediate gradation values) other than the two yellow patterns of the both ends has the width of the transport direction that is larger than the spot diameter of the optical sensor 54 and has the width of the movement direction that is smaller than the spot diameter of the optical sensor 54. Therefore, yellow patterns corresponding to a lot of gradation values can be formed in a narrow print area.

Figure 10B:
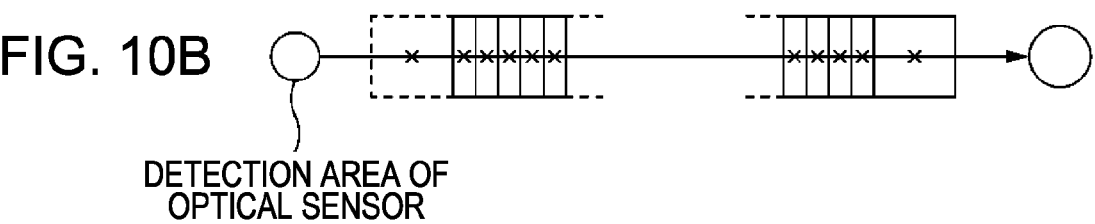
FIG. 10B is an illustrative diagram of an operation when a YC pattern is detected.
Figure 10C:
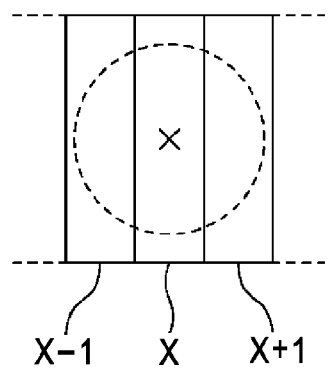
FIG. 10C is an illustrative diagram when a pattern having an intermediate gradation value X is detected.

FIG. 10B is an illustrative diagram of an operation when a YC pattern is detected. FIG. 10C is an illustrative diagram when a pattern having an intermediate gradation value X is detected.

In the embodiment, when the optical sensor 54 detects the pattern having the intermediate gradation value X, the detection area of the optical sensor extends from the pattern. However, as illustrated in FIG. 10C, a pattern having a gradation value X−1 is adjacently formed on the left side of the pattern having the intermediate gradation value X, and a pattern having a gradation value X+1 is adjacently formed on the right side of the pattern having the intermediate. That is, a pattern having a paler optical density is adjacently formed on the left side of the pattern having the intermediate gradation value X, and a pattern having a higher optical density is adjacently formed on the right side the pattern having the intermediate gradation value X. Therefore, even when the detection area of the optical sensor extends from the pattern having the intermediate gradation value X, the optical sensor 54 can output a value approximately corresponding to the optical density of the pattern having the intermediate gradation value X.

In such a YC pattern, the optical densities corresponding to the gradation values of many of yellow patterns can be detected (on the other hand, in the above-described embodiment, the mere optical densities corresponding to nine gradation values can be detected).

YC Pattern (2)

In a YC pattern of the above-described embodiment, the optical density (gradation value) of a cyan pattern is uniform regardless of the optical density (gradation value) of a yellow pattern. An area of a yellow pattern having a high gradation value has the largest amount of ink in total. Therefore, the optical density of the cyan pattern is desired to be set so that the ink amount of this area does not exceed a specific amount (the amount of ink that is acceptable to a media per unit area). That is, when the cyan optical density (cyan gradation value) of the YC pattern is uniform, the cyan optical density cannot be set excessively high.

Therefore, when a YC pattern is formed as described below, a large amount of cyan ink can be set.

FIG. 11 is an illustrative diagram of a cyan pattern and a yellow pattern that constitute a YC pattern. The shape of the yellow pattern is similar to that of the yellow pattern in FIG. 10A.

As illustrated in FIG. 11, the controller 60 controls a cyan pattern to be formed so that the optical density of the cyan pattern become paler as the optical density of a yellow pattern formed on the cyan pattern is higher. In addition, the controller 60 controls a cyan pattern to be formed so that the optical density of the cyan pattern becomes higher as the optical density of a yellow pattern formed on the cyan pattern is paler. That is, the controller 60 forms each pattern so that the optical density of a cyan pattern formed under a yellow pattern having a first optical density becomes higher than the optical density of a cyan pattern under a yellow pattern having a second optical density higher than the first optical density.

In addition, the controller 60 controls a yellow pattern similar to the yellow pattern in FIG. 10A to be formed on such a cyan pattern. As a result, anywhere within the print area, an ink amount per unit area is approximately the same. In addition, the amount of cyan ink under a yellow pattern having a low gradation value can be set relatively large (as described in FIG. 6B, the measurement of a yellow pattern is improved as the amount of cyan ink increases).

An actual yellow optical density itself can be detected with high accuracy because the output value "Praw (X)" of the optical sensor when a YC pattern is detected is normalized based on the output value "Praw_c (X)" of the optical sensor when a C pattern is detected even when the optical densities of cyan patterns are different depending on yellow gradation value.

The cyan pattern in FIG. 11 may be used for cyan color calibration. As described above, after a cyan pattern is formed (S101 of FIG. 7), the optical density of the cyan pattern is detected using the optical sensor 54 (S104 of FIG. 7) before a yellow pattern is formed (S105 of FIG. 7). In the detection of the optical density of the cyan pattern, the optical density corresponding to each cyan gradation value is detected, and the cyan color calibration may be performed based on the detection result.

Relationship with a Pattern Having Another Color

Figure 12:
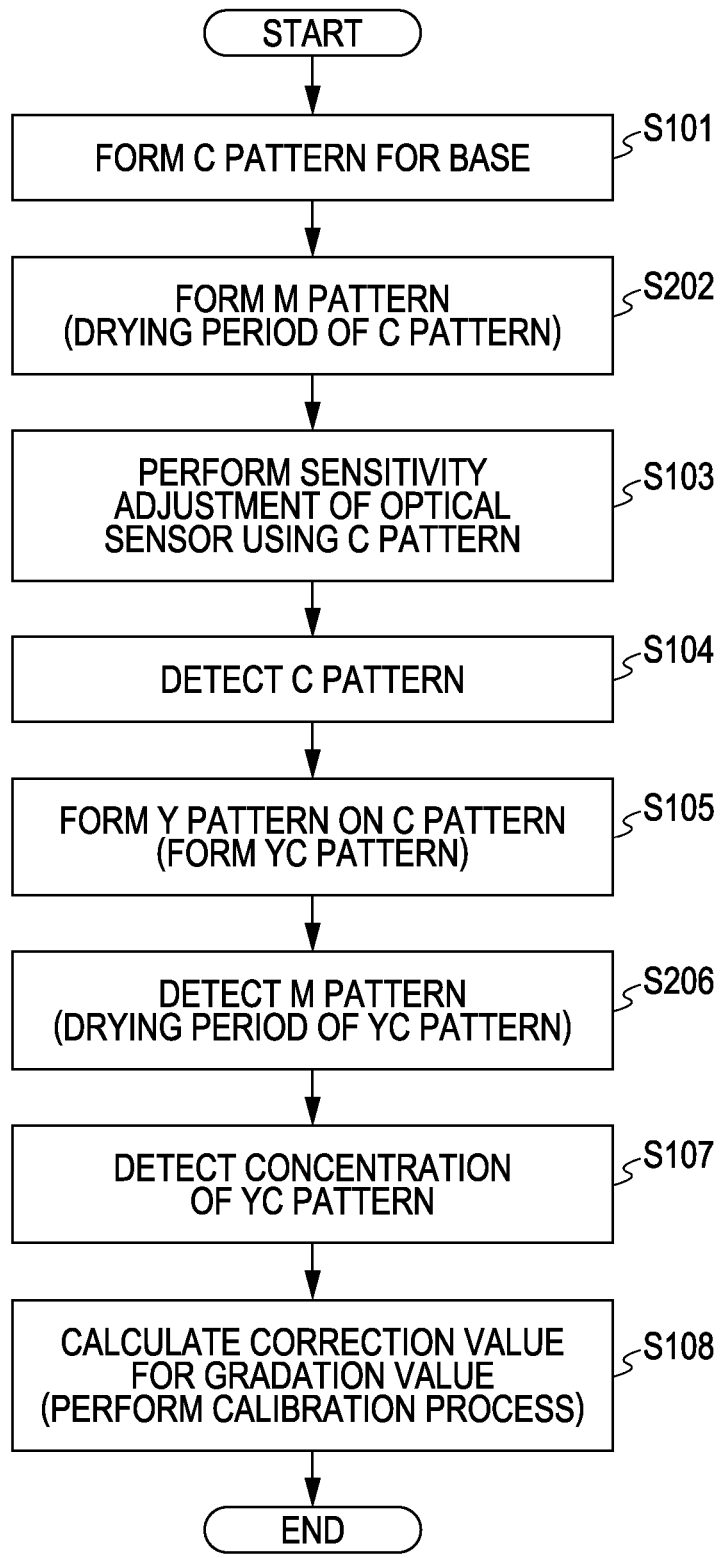
FIG. 12 is a flowchart of the color calibration method in which an M pattern is taken into account.

FIG. 12 is a flowchart of a color calibration method in consideration of a magenta pattern. The same step numbers are given to steps similar to the steps in FIG. 7, and the description is omitted.

Here, after the controller 60 controls a C pattern to be formed (S101), magenta ink (that corresponds to third ink) is discharged from the magenta ink nozzle group of the head 41 before the optical density of the C pattern is detected using the optical sensor 54 (S104), and a magenta pattern (hereinafter may be referred to as "M pattern") is formed (S202). As a result, a print time of the M pattern can be used for a drying period of the C pattern, thereby reducing the processing time of the color calibration.

In addition, after the controller 60 controls a YC pattern to be formed by forming a Y pattern on the C pattern (S105), the optical density of the M pattern is detected using the optical sensor (S206) before the optical density of the YC pattern is detected using the optical sensor (S104). As a result, a detection time of the M pattern can be used for a drying period of the YC pattern, thereby reducing the processing time of the color calibration.

Sensitivity Adjustment of the Optical Sensor

In the process of the sensitivity adjustment of the optical sensor 54 in S103 (see FIG. 7), the controller 60 increases the output of the light source of the optical sensor 54 so that the output of the optical sensor 54 does not become excessively bright (so that the output of the optical sensor 54 does not become a maximum output due to reflected light from a C pattern). However, the sensitivity adjustment of the optical sensor 54 is not limited to the process to increase the output of the light source. For example, the output of the light source of the optical sensor 54 may be adjusted so as to be reduced from the state of being excessively bright.

Determination Method of Ink to be Applied Under a Y Pattern

In the embodiment, the reason why a cyan pattern is formed under a yellow pattern instead of a magenta pattern is described.

Figure 13:
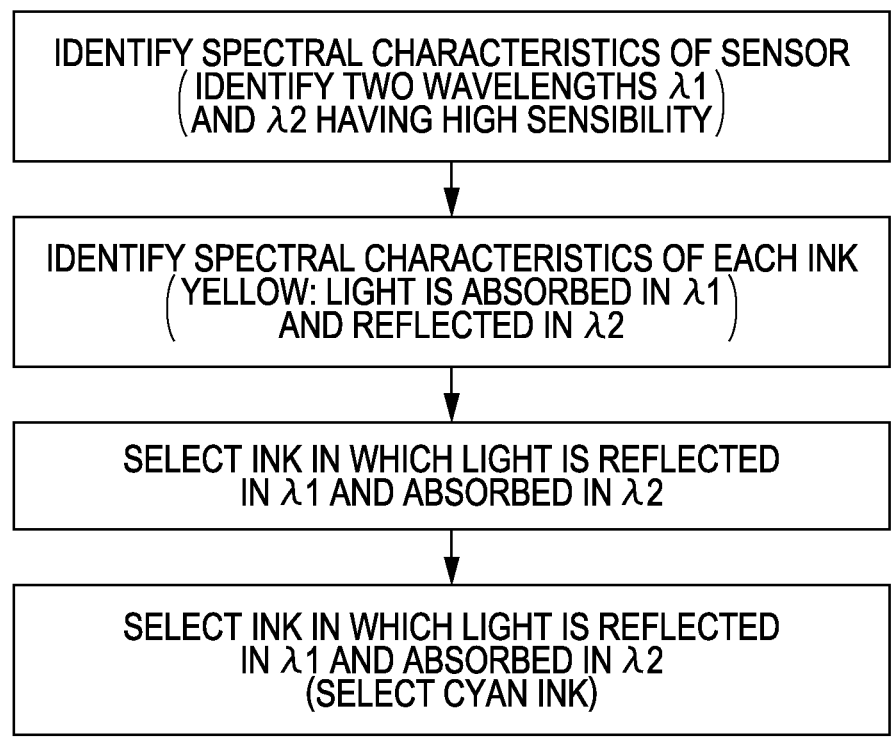
FIG. 13 is a flowchart of a process for determining ink to be used.

FIG. 13 is a flowchart of a process for determining ink to be used.

First, spectral characteristics of the optical sensor 54 are identified. For example, the spectral characteristics g ($\lambda$) as illustrated in FIG. 4 are obtained.

At this time, a wavelength having high sensitivity of the optical sensor 54 is identified. Here, as illustrated in FIG. 4, there is a relatively small peak in the vicinity of a wavelength of 460 nm (=$\lambda 1$), and there is a relatively large peak in the vicinity of a wavelength of 600 nm (=$\lambda 2$). There are the two peaks because the light source of the optical sensor 54 includes the blue LED and the phosphor that shows a yellow fluorescence.

Next, spectral characteristics for each ink are identified.

Figure 14:
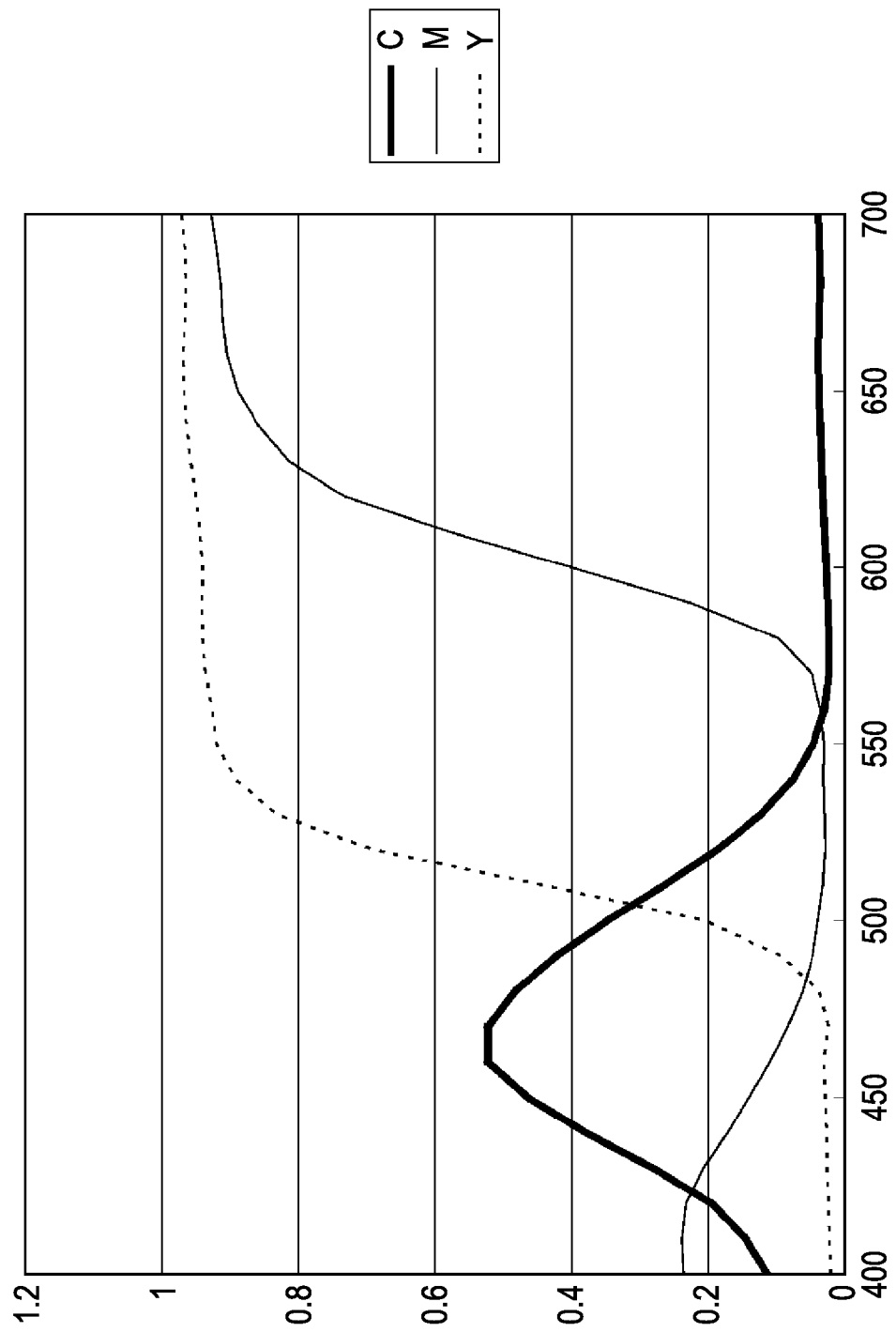
FIG. 14 is a graph of the measurement result of spectral characteristics of each of Y pattern, C pattern, and M pattern.

FIG. 14 is a graph of the measurement result of spectral characteristics of each of a Y pattern, a C pattern, and an M pattern. A thin dotted line in FIG. 14 indicates spectral characteristics of the Y pattern, a thick solid line in FIG. 14 indicates spectral characteristics of the C pattern, and a thin solid line in FIG. 14 indicates spectral characteristics of the M pattern. Any of the patterns is formed with a gradation value of 255.

As illustrated in FIG. 14, in the case of the Y pattern, light is absorbed in a wavelength of 460 nm (=$\lambda 1$) and reflected in a wavelength of 600 nm (=$\lambda 2$).

Therefore, next, contrary to the Y pattern, ink is selected in which in light is reflected in a wavelength of 460 nm (=$\lambda 1$) and absorbed in a wavelength of 600 nm (=$\lambda 2$). As illustrated in FIG. 14, when the cyan ink and the magenta ink are compared, the cyan ink shows a tendency to reflect light in a wavelength of 460 nm (=$\lambda 1$) and absorb light in a wavelength of 600 nm (=$\lambda 2$). Thus, it is determined that a cyan pattern is formed under a yellow pattern, instead of a magenta pattern.

In the above description, cyan ink that shows a tendency to reflect light in a wavelength of 460 nm (=$\lambda 1$) and absorb light in a wavelength of 600 nm (=$\lambda 2$) is selected from two types of cyan ink and magenta ink because types of ink that the head can discharge are cyan ink, magenta ink, and yellow ink (and black) (see FIG. 3). Alternatively, when the head can discharge ink having another color, the ink having another color can be selected after being subject to a similar determination process.

Ink Having Another Color

Orange Ink

The head 41 may include an orange ink nozzle group Or because a color reproduction area is expanded by using orange ink.

Figure 15A:
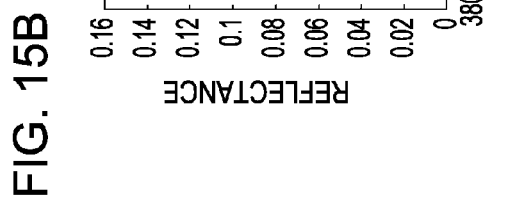
FIG. 15A is a graph of the measurement result of spectral characteristics of an Or pattern.

FIG. 15A is a graph of the measurement result of spectral characteristics of an orange patch pattern (hereinafter referred to as "Or pattern"). In the following description, a curved line of the measurement result of spectral characteristics of an Or pattern having one gradation value may be referred to as R_o ($\lambda$).

In FIG. 15A, curved lines of the measurement results of Or patterns of the respective gradation values are drawn so as to overlap each other. As can be understood from FIG. 15A, in areas of wavelengths of 550 nm or less, the reflectances of the Or patterns are different depending on gradation value. In addition, in areas of wavelengths of 580 nm or more, any of the Or patterns has a high reflectance regardless of the gradation value.

In the graph of FIG. 15A, for reference, the spectral characteristics g ($\lambda$) of the optical sensor is indicated by a thick line. A wavelength having a smaller peak in the g ($\lambda$) is in a band in which the reflectance of an Or pattern varies depending on gradation value, and a wavelength having a larger peak in the g ($\lambda$) is in a band in which the reflectance of an Or pattern becomes high regardless of the gradation value.

Figure 15B:
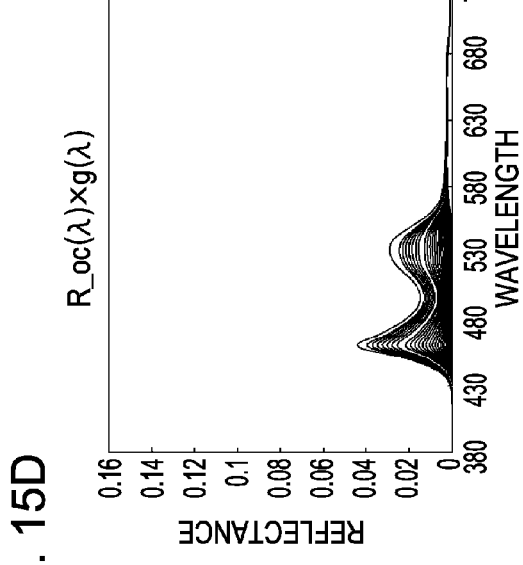
FIG. 15B is a graph obtained by multiplying spectral characteristics $R\_o (\lambda)$ of the Or pattern by the spectral characteristics $g (\lambda)$ of the optical sensor.

FIG. 15B is a graph obtained by multiplying spectral characteristics R_o ($\lambda$) of an Or pattern by the spectral characteristics g ($\lambda$) of the optical sensor. The spectral characteristics R_o ($\lambda$) of an Or pattern indicate a high reflectance in areas of wavelengths of 580 nm or more regardless of the gradation value (see FIG. 15A), and there is a high peak in the vicinity of a wavelength of 600 nm in the spectral characteristics g ($\lambda$) of the optical sensor (see FIG. 4), so that there is a high peak in the vicinity of a wavelength of 600 nm in the graph of FIG. 15B in any of the gradation value of an Or pattern.

Therefore, the dynamic range of the outputs of the optical sensor (ratio of maximum and minimum values of the outputs of the optical sensor) is small (that is, the optical density difference of the Or patterns is difficult to be detected) even when the optical sensor detects Or patterns having different gradation values.

Next, among the gradation values of 0 to 255, about 40 orange patch patterns each having value difference of about 6 or 7 are formed on a white medium after a cyan pattern having uniform optical density is formed, and the reflectance spectral characteristics of each of the patch patterns are measured. In the following description, the orange patch pattern formed on the cyan pattern may be referred to as "OrC pattern".

Figure 15C:
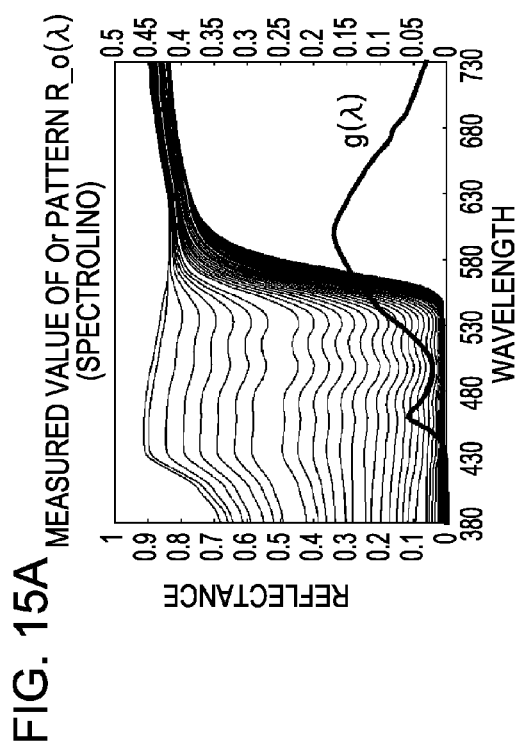
FIG. 15C is a graph of the measurement result of spectral characteristics of an OrC pattern.

FIG. 15C is a graph of the measurement result of spectral characteristics of an OrC pattern. In the following description, a curved line of the measurement result of spectral characteristics of an OrC pattern having one gradation value may be referred to as R_oc ($\lambda$).

In FIG. 15C, curved lines of the measurement results of OrC patterns of the respective gradation values are drawn so as to overlap each other. As can be understood from FIG. 15C, in areas of wavelengths of 550 nm or less, the reflectances of the OrC patterns are different depending on gradation value. In addition, in areas of wavelengths of 580 nm or more, any of the OrC patterns has a low reflectance regardless of the gradation value because the cyan pattern absorbs a yellow wavelength.

In the graph of FIG. 15C, for reference, the spectral characteristics g (λ) of the optical sensor are indicated by a thick line. As illustrated in FIG. 15C, in a wavelength having a larger peak in the g (λ), any of the OrC patterns has a low reflectance regardless of the gradation value.

Figure 15D:
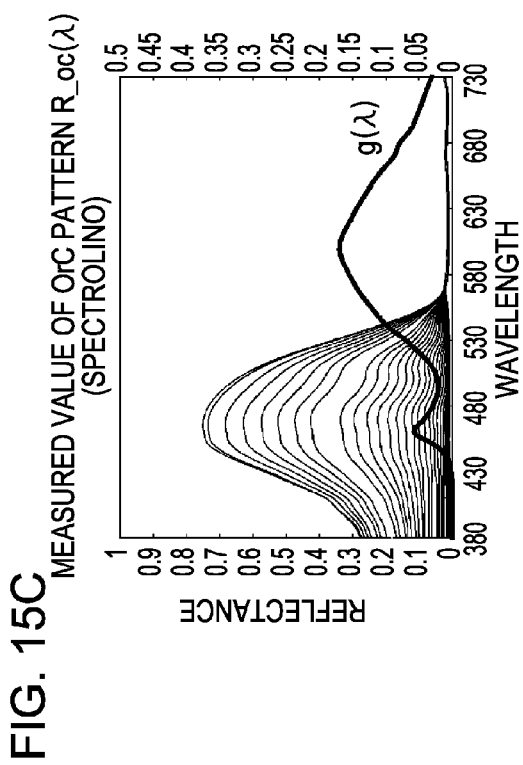
FIG. 15D is a graph by multiplying spectral characteristics $R\_oc (\lambda)$ of the OrC pattern by the spectral characteristics $g (\lambda)$ of the optical sensor.

FIG. 15D is a graph obtained by multiplying spectral characteristics R_oc (λ) of an OrC pattern by the spectral characteristics g (λ) of the optical sensor. The spectral characteristics R_oc (λ) of an OrC pattern indicate a low reflectance in areas of wavelengths of 580 nm or more regardless of the gradation value (see FIG. 15C), so that, in the graph of FIG. 15D, a peak in the vicinity of a wavelength of 580 nm is low in any of the gradation values of OrC patterns as compared with the peak in a wavelength of 600 nm in the graph of FIG. 15B.

Therefore, the dynamic range of the outputs of the optical sensor is large (that is, the optical density difference of the OrC patterns is easy to be detected) when the optical sensor detects OrC patterns having different gradation values.

Figure 16A:
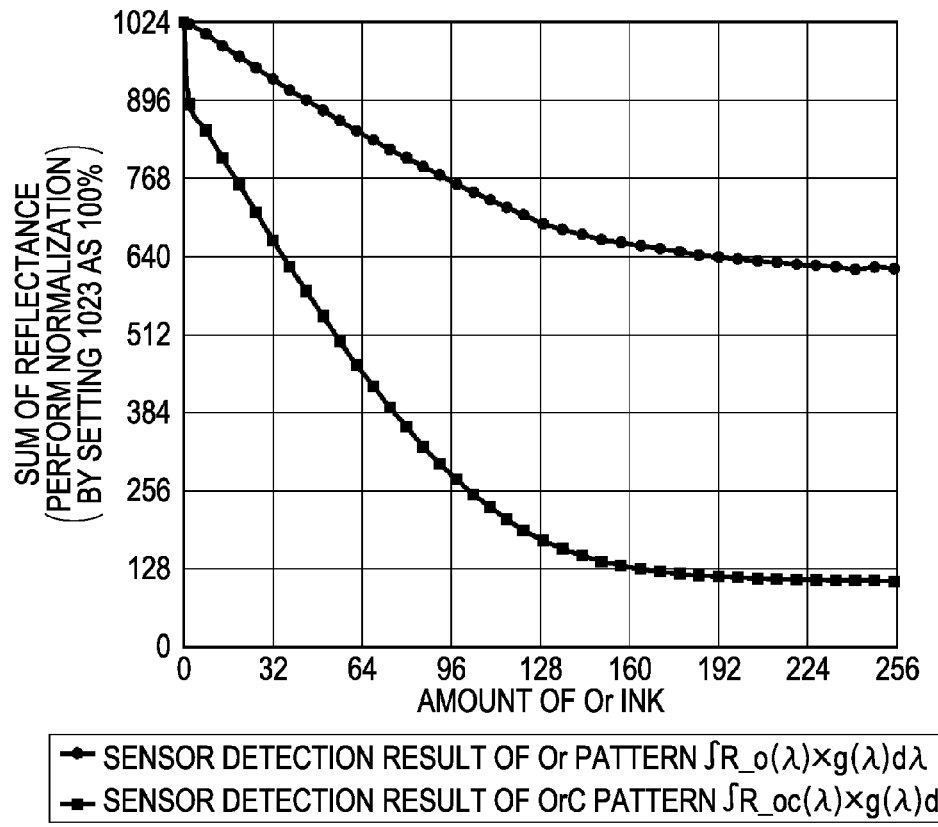
FIG. 16A is a graph of output change of the optical sensor for an orange gradation value.

FIG. 16A is a graph of output change of the optical sensor for an orange gradation value. The horizontal axis in FIG. 16A indicates an orange ink amount (orange gradation value). The vertical axis in FIG. 16A indicates the output of the optical sensor, and in the vertical axis, the maximum output value of the optical sensor is normalized so as to be "1024 (10 bit)". A square mark dot in FIG. 16A indicates a case of an Or pattern, and a circled dot indicates a case of an OrC pattern.

As illustrated in FIG. 16A, the dynamic range in an OrC pattern is large compared with the case of an Or pattern. That is, in the case where an orange patch pattern is measured, it is easy for the optical sensor to detect the optical density difference of the orange patch patterns when there is a cyan pattern under the orange patch patterns.

Therefore, when an orange patch pattern for color calibration is formed, it is desirable that a cyan pattern be formed under the orange patch pattern.

However, the optical density of an OrC pattern is not allowed to be used for color calibration as the optical density of the orange pattern as-is because the optical density of the OrC pattern is affected by the optical density of the cyan pattern.

Therefore, in the embodiment, before an orange pattern is formed on a cyan pattern, the cyan pattern is detected using the optical sensor. In addition, the optical density of the orange pattern is calculated by normalizing an output value of the optical sensor when an OrC pattern is detected using an output value of the optical sensor when the cyan pattern is detected. As a result, the actual optical density of the orange pattern can be obtained with high accuracy without being affected by the optical density of the cyan pattern.

Figure 16B:
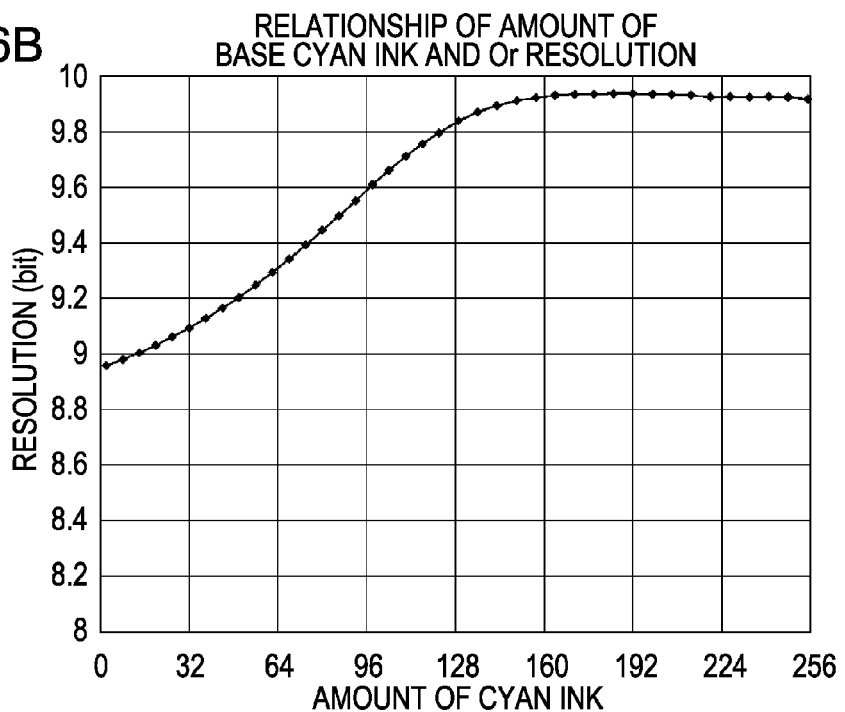
FIG. 16B is a graph illustrating change in the dynamic range of the optical sensor for different amounts of cyan ink.

FIG. 16B is a graph illustrating change in the dynamic range of the optical sensor for different amounts of cyan ink. In the case of orange ink, when the amount of cyan ink exceeds a specific amount, the dynamic range does not become large even when the amount of cyan ink is increased. Therefore, it is good for the cyan gradation value to be set about 128 (50% optical density).

Light Magenta Ink

The head 41 may include a light magenta ink nozzle group Lm because a smooth gradation can be expressed by using the light magenta ink.

FIG. 17A is a graph of the measurement result of spectral characteristics of a light magenta patch pattern (hereinafter referred to as "Lm pattern"). FIG. 17B is a graph obtained by multiplying spectral characteristics R_lm (λ) of an Lm pattern by the spectral characteristics g (λ) of the optical sensor. FIG. 17C is a graph of the measurement result of spectral characteristics of a light magenta patch pattern formed on a cyan pattern (hereinafter referred to as "LmC pattern"). FIG. 17D is a graph obtained by multiplying spectral characteristics R_lmc (λ) of an LmC pattern by the spectral characteristics g (λ) of the optical sensor.

The dynamic range of the outputs of the optical sensor (ratio of maximum and minimum values of the outputs of the optical sensor) is small (that is, the optical density difference of the Lm patterns is difficult to be detected) even when the optical sensor detects Lm patterns having different gradation values (the description of which is omitted here). However, the dynamic range of the outputs of the optical sensor is large (that is, the optical density difference of the LmC patterns is easy to be detected) when the optical sensor detects LmC patterns having different gradation values.

Figure 18A:
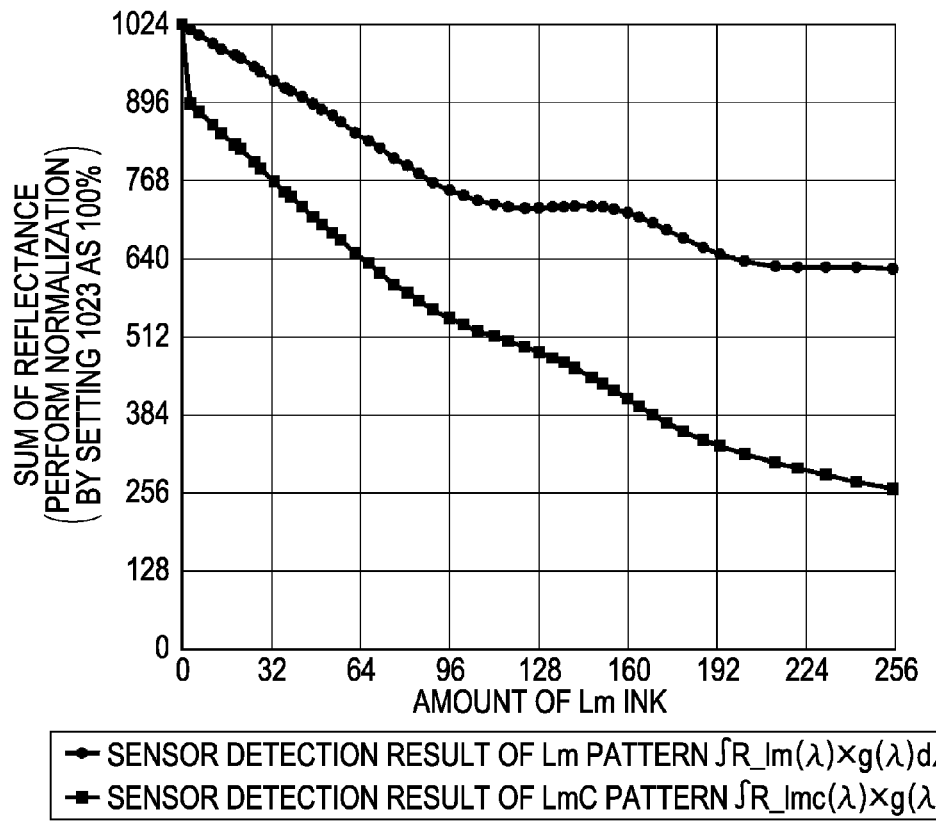
FIG. 18A is a graph of output change of the optical sensor for a light magenta gradation value.

FIG. 18A is a graph of output change of the optical sensor for a light magenta gradation value.

As illustrated in FIG. 18A, the dynamic range in the LmC pattern is large compared with the case of the Lm pattern. That is, in the case where a light magenta patch pattern is measured, it is easy for the optical sensor to detect the optical density difference of the light magenta patch patterns when there is a cyan pattern under the orange patch patterns.

Therefore, when a light magenta pattern for color calibration is formed, it is desirable that a cyan pattern be formed under the light magenta patch pattern.

However, the optical density of an LmC pattern is not allowed to be used for color calibration as the optical density of the light magenta pattern as-is because the optical density of the LmC pattern is affected by the optical density of the cyan pattern.

Therefore, before a light magenta pattern is formed on a cyan pattern, the cyan pattern is detected using the optical sensor. In addition, an output value of the optical sensor when an LmC pattern is detected is normalized using an output value of the optical sensor when the cyan pattern is detected, so that the optical density of the light magenta pattern is calculated. As a result, the actual optical density of the light magenta pattern can be obtained with high accuracy without being affected by the optical density of the cyan pattern.

Figure 18B:
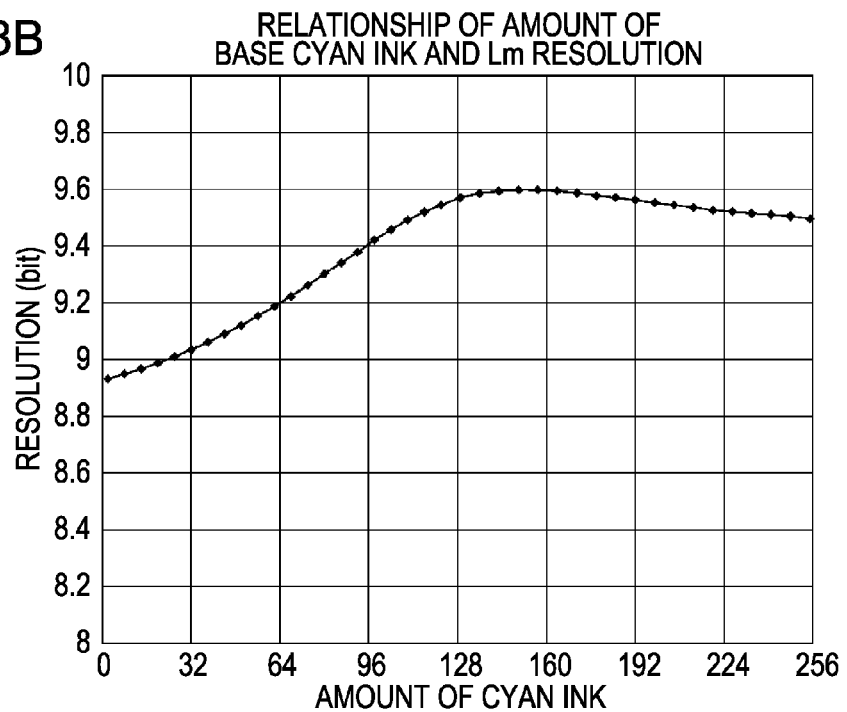
FIG. 18B is a graph illustrating change in the dynamic range of the optical sensor for different amounts of cyan ink.

FIG. 18B is a graph illustrating change in the dynamic range of the optical sensor for different amounts of cyan ink. In the case of light magenta ink, the dynamic range is the largest when a gradation value is set to 150. Therefore, it is good for the cyan gradation value to be set about 150.

Others

In the above-described embodiment, mainly, the printing apparatus including the optical sensor is described, and it goes without saying that the above-described embodiment includes the disclosure of a printing method, a color calibration method, a printing method of a test pattern, a test pattern, etc.

In addition, the above-described embodiment is intended to facilitate the understanding of the invention and is not intended to be construed as limiting the invention. The present invention can be changed and modified without departing from the digit, and may include the equivalent.

Printing Apparatus

In the above-described printing apparatus 1, the head 41 can move in the movement direction, and the printing apparatus 1 is a type in which printing is performed by alternately repeating the process in which dots are formed by intermittently discharging ink while the head moves in the movement direction, and the process in which the transport unit 20 transports a medium in the transport direction (so-called serial type printing apparatus). However, the configuration of the printing apparatus is not limited to the type. For example, in the printing apparatus 1, the head may be fixed, and the printing apparatus 1 may be a type in which printing may be performed by forming dots on a medium by intermittently discharging ink from the head while the medium is transported (so-called line type printing apparatus).

The entire disclosure of Japanese Patent Application No. 2011-229944, filed Oct. 19, 2011 is expressly incorporated by reference herein.

What is claimed is:

1. A printing apparatus comprising:
   (A) a head that discharges first ink and second ink having a color different from that of the first ink;
   (B) an optical sensor that includes a light source and a light receiving section; and
   (C) a controller, wherein
   in a case in which the controller corrects a discharge amount of the second ink,
   the controller causes the head to discharge the first ink to form a first pattern on a medium,
   the controller causes the optical sensor to detect light reflected from the first pattern,
   the controller causes the head to discharge the second ink to form a plurality of second patterns having different gradation values on the first pattern, and
   the controller causes the optical sensor to detect light reflected from the second pattern,
   wherein the controller changes the optical density of the first pattern depending on the type of the medium.

2. The printing apparatus according to claim 1, wherein the output of the light source is adjusted by the light reflected from the first pattern.

3. The printing apparatus according to claim 1, wherein an optical density of the first pattern under the second pattern having a first optical density is higher than an optical density of the first pattern under the second pattern having a second optical density that is higher than the first optical density.

4. The printing apparatus according to claim 1, wherein the head is allowed to discharge third ink having a color that is different from those of the first ink and the second ink, and
   after formation of the first pattern, the controller causes the head to discharge the third ink to form a third pattern on the medium before the controller causes the optical sensor to detect the light reflected from the first pattern.

5. The printing apparatus according to claim 1, wherein the head is allowed to discharge the third ink having a color that is different from those of the first ink and the second ink, and
   after formation of the second pattern on the first pattern, the controller causes the optical sensor to detect light reflected from the third pattern formed on the medium by the third ink before the controller causes the optical sensor to detect the light reflected from the second pattern.

6. The printing apparatus according to claim 1, wherein
   the light source is a white LED including a blue LED and a phosphor that shows a yellow fluorescence,
   the first ink is cyan, and
   the second ink is yellow.

7. A printing method for correcting an amount of second ink to be discharged from a head that discharges first ink and the second ink having a color different from that of the first ink, the method comprising:
   forming a first pattern on a medium by discharging the first ink from the head;
   detecting light reflected from the first pattern using an optical sensor;
   discharging the second ink having the color different from that of the first ink, from the head and forming a plurality of second patterns having different gradation values on the first pattern;
   detecting light reflected from the second pattern using the optical sensor; and
   changing the optical density of the first pattern depending on the type of the medium.

8. A printing apparatus comprising:
   (A) a head that discharges first ink and second ink having a color different from that of the first ink;
   (B) an optical sensor that includes a light source and a light receiving section; and
   (C) a controller, wherein
   in a case in which the controller corrects a discharge amount of the second ink,
   the controller causes the head to discharge the first ink to form a first pattern on a medium,
   the controller causes the optical sensor to detect light reflected from the first pattern,
   the controller causes the head to discharge the second ink to form a plurality of second patterns having different gradation values on the first pattern, and
   the controller causes the optical sensor to detect light reflected from the second pattern,
   wherein an optical density of the first pattern under the second pattern having a first optical density is higher than an optical density of the first pattern under the second pattern having a second optical density that is higher than the first optical density.

* * * * *